(12) United States Patent
Isono

(10) Patent No.: US 7,167,323 B2
(45) Date of Patent: Jan. 23, 2007

(54) TAKING LENS SYSTEM

(75) Inventor: Masashi Isono, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/982,905

(22) Filed: Nov. 8, 2004

(65) Prior Publication Data

US 2005/0057679 A1   Mar. 17, 2005

Related U.S. Application Data

(62) Division of application No. 10/300,738, filed on Nov. 21, 2002, now Pat. No. 6,927,927.

(30) Foreign Application Priority Data

| Nov. 27, 2001 | (JP) | ............................. 2001-361363 |
| Feb. 19, 2002 | (JP) | ............................. 2002-272939 |
| Jul. 30, 2002 | (JP) | ............................. 2002-220692 |
| Jul. 30, 2002 | (JP) | ............................. 2002-220699 |
| Sep. 19, 2002 | (JP) | ............................. 2002-272934 |

(51) Int. Cl.
 *G02B 9/12* (2006.01)
 *G02B 13/18* (2006.01)
 *G02B 3/02* (2006.01)

(52) U.S. Cl. ...................... 359/791; 359/716

(58) Field of Classification Search ............... 359/689, 359/791, 716, 784, 708, 753
See application file for complete search history.

(56) References Cited

U.S. PATENT DOCUMENTS 3,998,527 A * 12/1976 Ikeda et al. ................. 359/716

5,071,235 A   12/1991  Mori et al.
5,475,536 A   12/1995  Kikutani
5,726,810 A *  3/1998  Meyers ...................... 359/689

(Continued)

FOREIGN PATENT DOCUMENTS

JP   01-245211   9/1989

(Continued)

*Primary Examiner*—Alicia M Harrington
(74) *Attorney, Agent, or Firm*—Buchanan Ingersoll & Rooney PC

(57) ABSTRACT

A taking lens system has two lens elements, namely, from the object side, a positive lens element and a meniscus lens element convex to the image side, wherein the focal length of the entire taking lens system and the axial thickness from the object-side surface of the positive lens element to the image-side surface of the meniscus lens element fulfill a prescribed relation. Alternatively, a taking lens system has two lens elements, namely, from the object side, a first lens element having a meniscus shape with a convex surface on the object side and having a positive optical power and a second lens element having a meniscus shape with a concave surface on the image side, wherein the focal lengths of the first and second lens elements fulfill a prescribed relation. Alternatively, a taking lens system has three lens elements, namely, from the object side, a first lens element having a weak optical power, an aperture stop, a second lens element having a positive optical power, and a third lens element having a concave surface on the image side and having a negative optical power, wherein the focal length of the entire taking lens system and the focal lengths of the first and third lens elements fulfill prescribed relations.

9 Claims, 25 Drawing Sheets

U.S. PATENT DOCUMENTS

| | | |
|---|---|---|
| 5,739,965 A | 4/1998 | Ohno |
| 5,835,281 A | 11/1998 | Ohno |
| 5,917,661 A | 6/1999 | Tochigi et al. |
| 5,995,298 A | 11/1999 | Ohno |
| 6,011,648 A | 1/2000 | Mukai et al. |
| 6,333,822 B1 * | 12/2001 | Ohtake ................ 359/689 |
| 6,650,485 B1 | 11/2003 | Shinohara |

FOREIGN PATENT DOCUMENTS

| | | |
|---|---|---|
| JP | 06-088939 | 3/1994 |
| JP | 07-325254 | 12/1995 |
| JP | 07-333502 | 12/1995 |
| JP | 08-050240 | 2/1996 |
| JP | 08-129133 | 5/1996 |
| JP | 08-160298 | 6/1996 |
| JP | 11-052227 | 2/1999 |
| JP | 2001-183578 | 7/2001 |
| JP | 2001-272598 | 10/2001 |
| JP | 2002-098889 | 4/2002 |

* cited by examiner

FNO=2.8

— d
— — g
— — — c
— — — SC

-0.1   0.1
SPHERICAL SINE
ABERRATION CONDITION

Y'=1.7

— — — DM
——— DS

-0.1   0.1
ASTIGMATISM

Y'=1.7

-5.0   5.0
DISTORTION%

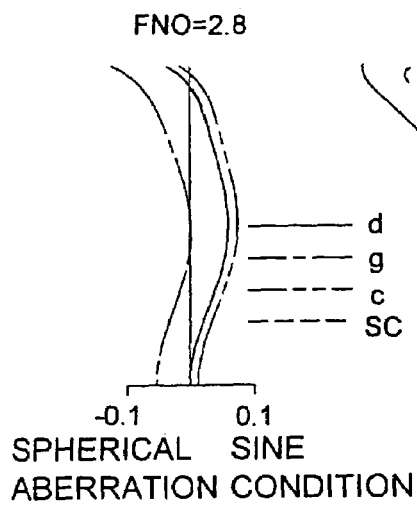 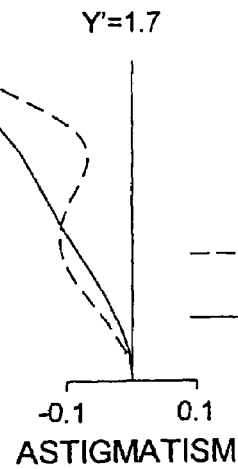 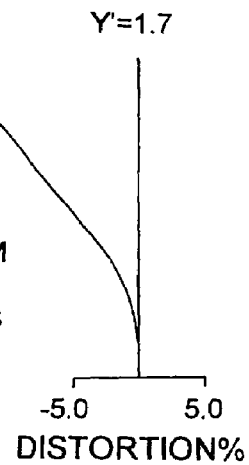
FIG.7A  FNO=2.8
FIG.7B  Y'=1.7
FIG.7C  Y'=1.7
SPHERICAL ABERRATION / SINE CONDITION
ASTIGMATISM
DISTORTION%
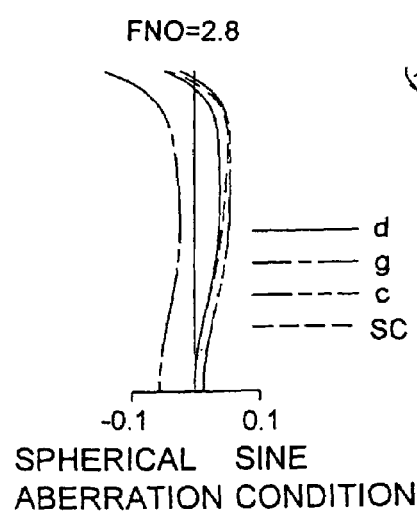 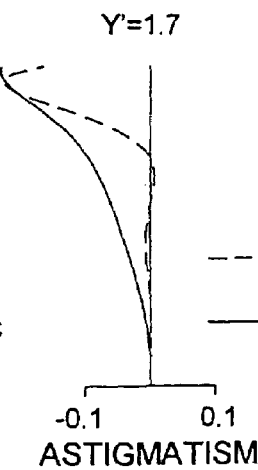 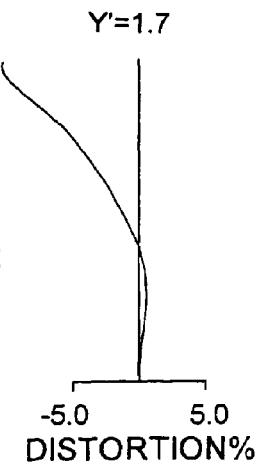
FIG.8A  FNO=2.8
FIG.8B  Y'=1.7
FIG.8C  Y'=1.7
SPHERICAL ABERRATION / SINE CONDITION
ASTIGMATISM
DISTORTION%

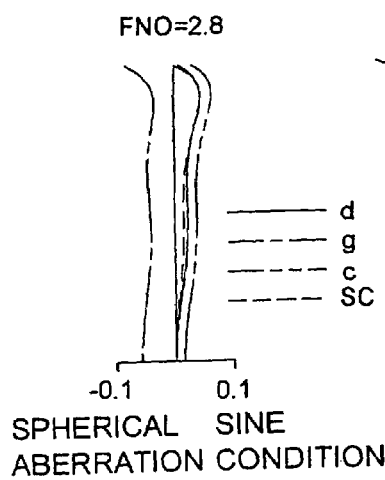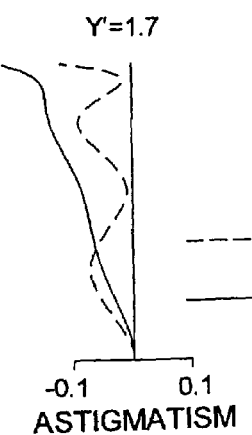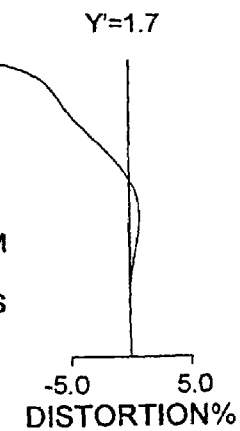
FIG.9A FNO=2.8 — SPHERICAL ABERRATION SINE CONDITION
FIG.9B Y'=1.7 — ASTIGMATISM
FIG.9C Y'=1.7 — DISTORTION%
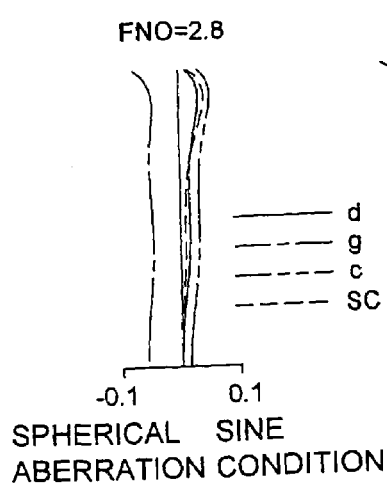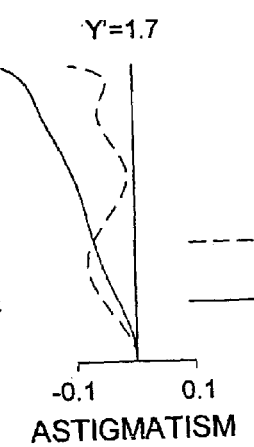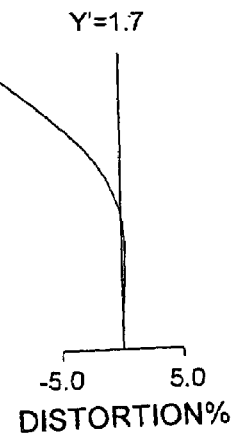
FIG.10A FNO=2.8 — SPHERICAL ABERRATION SINE CONDITION
FIG.10B Y'=1.7 — ASTIGMATISM
FIG.10C Y'=1.7 — DISTORTION%

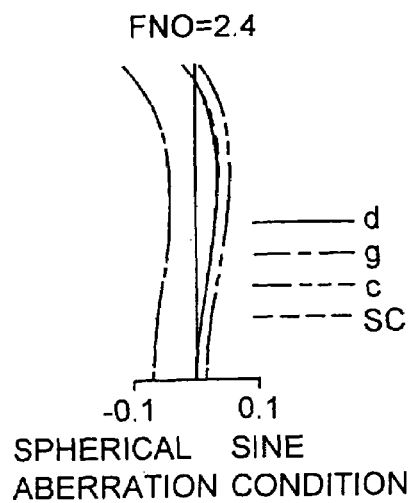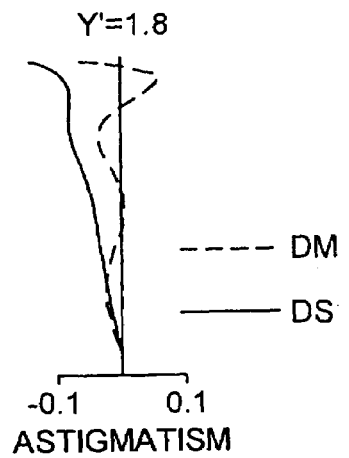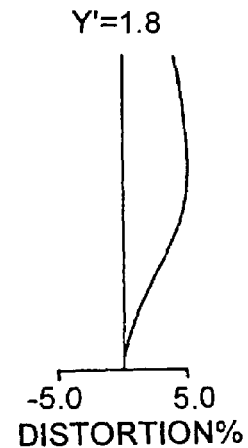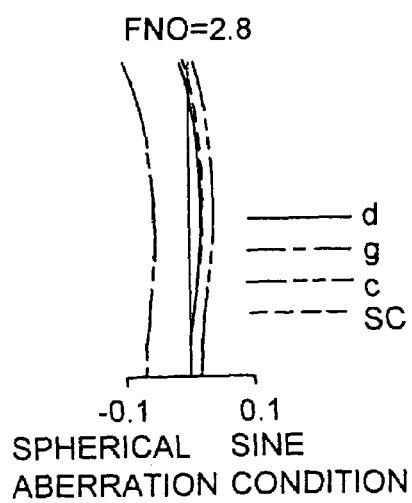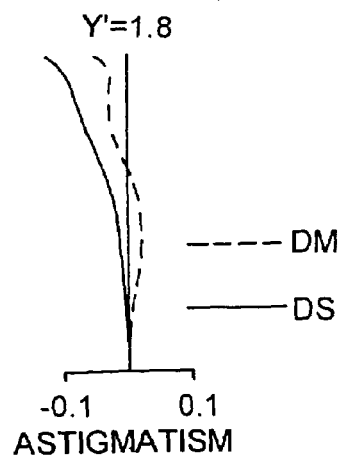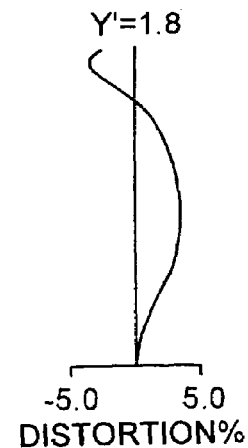

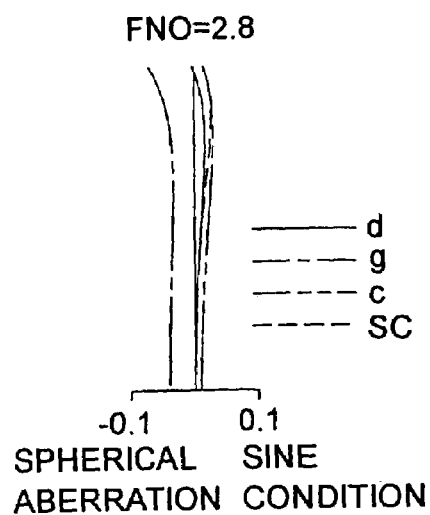
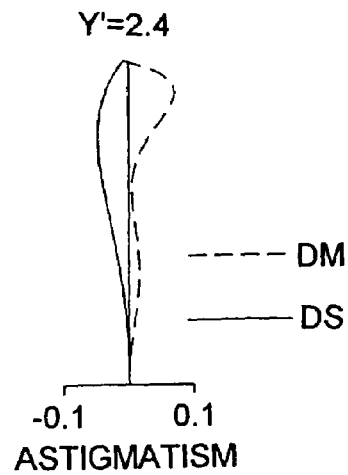
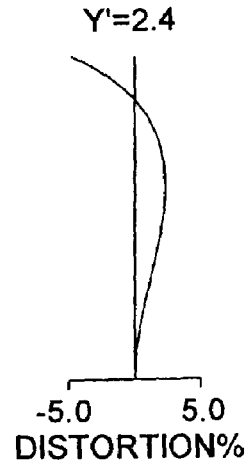
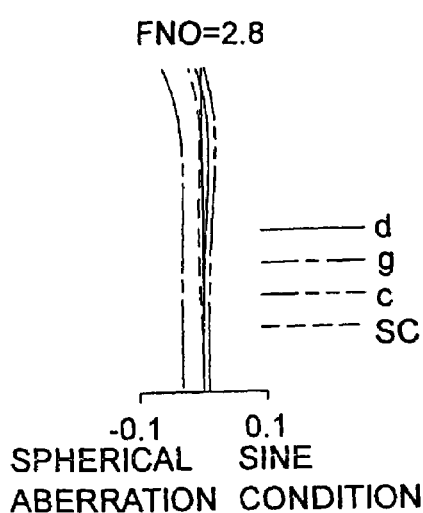
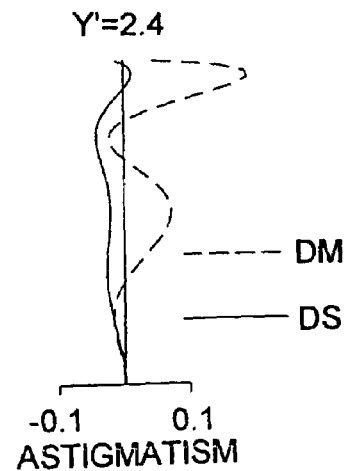
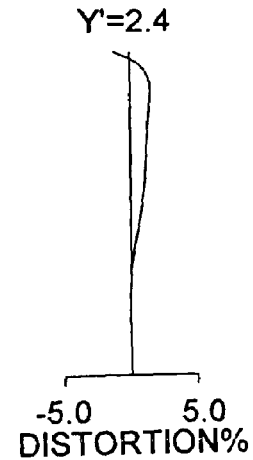

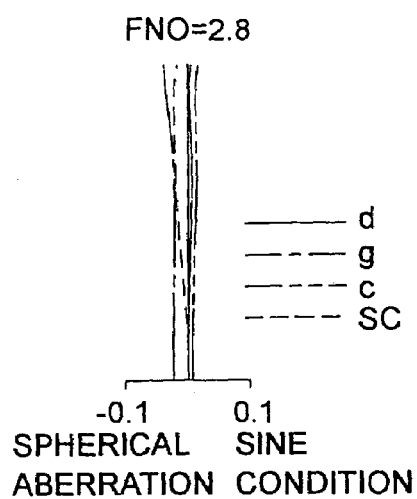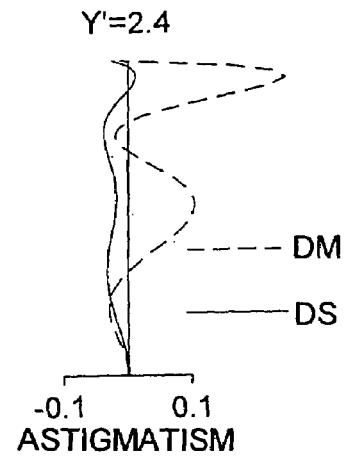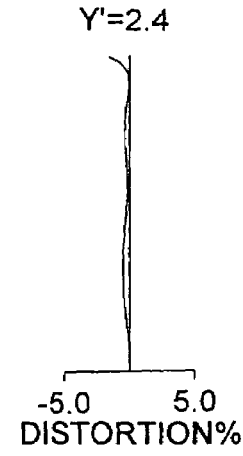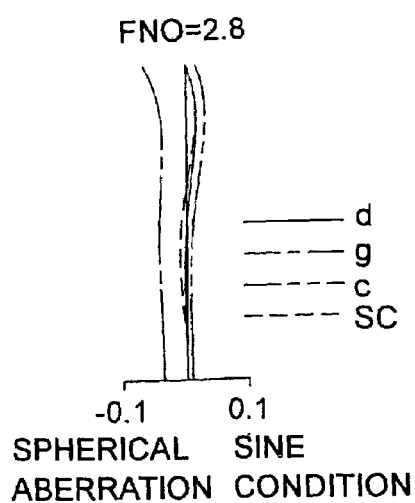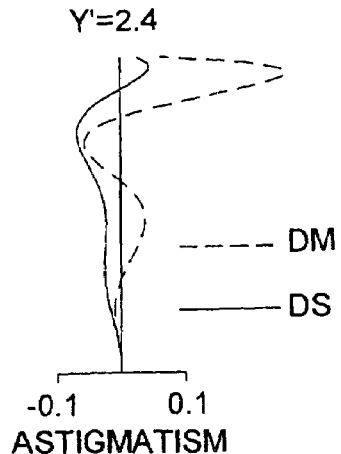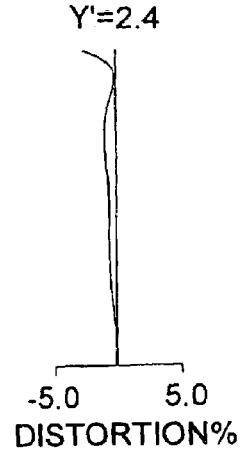

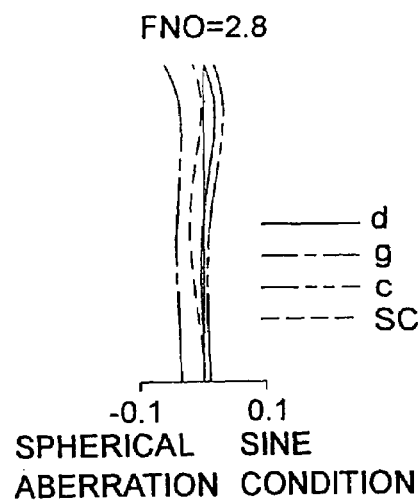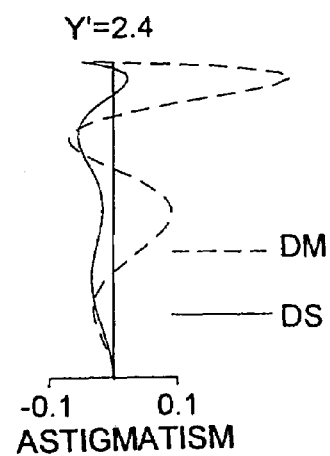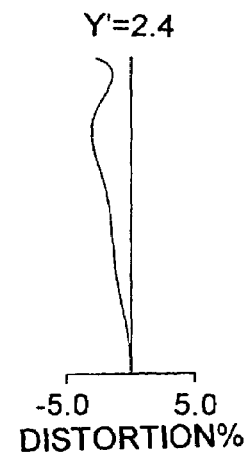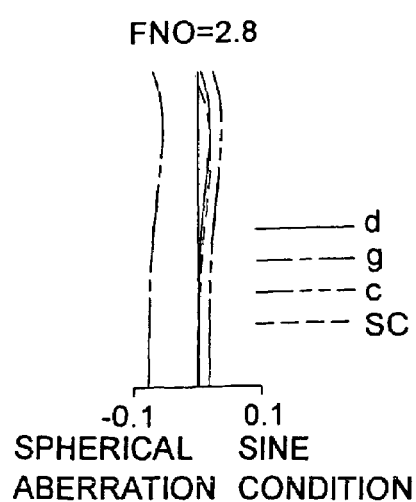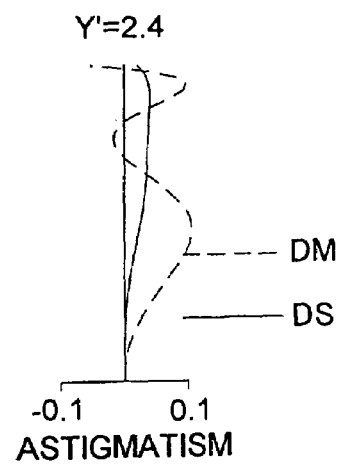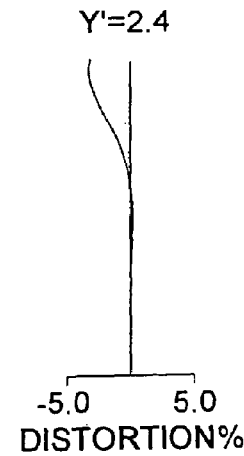

FNO=2.8

— d
—·— g
——— c
——— SC

-0.1   0.1
SPHERICAL SINE
ABERRATION CONDITION

Y'=3.3

---- DM
—— DS

-0.1   0.1
ASTIGMATISM

Y'=3.3

-5.0   5.0
DISTORTION%

FNO=2.8

— d
—·— g
——— c
——— SC

-0.1   0.1
SPHERICAL SINE
ABERRATION CONDITION

Y'=3.3

---- DM
—— DS

-0.1   0.1
ASTIGMATISM

Y'=3.3

-5.0   5.0
DISTORTION%

FIG.39A
FNO=2.8
FIG.39B
Y'=2.4
FIG.39C
Y'=2.4
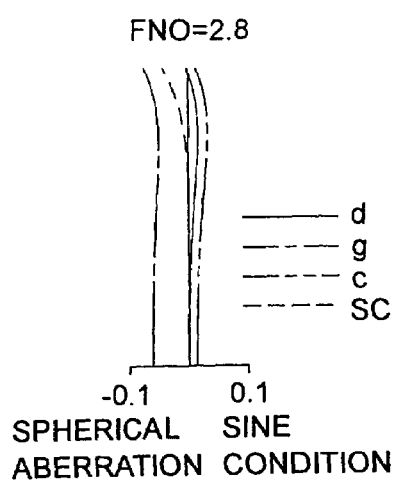
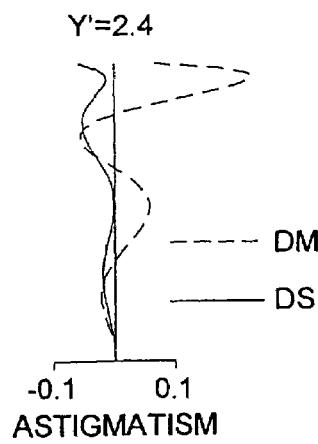
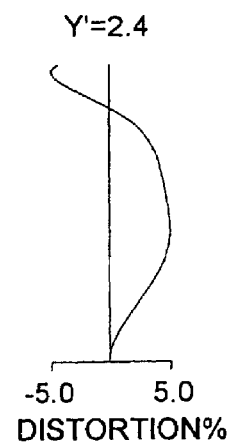
-0.1   0.1
SPHERICAL SINE
ABERRATION CONDITION
-0.1   0.1
ASTIGMATISM
-5.0   5.0
DISTORTION%
FIG.40A
FNO=2.8
FIG.40B
Y'=2.4
FIG.40C
Y'=2.4
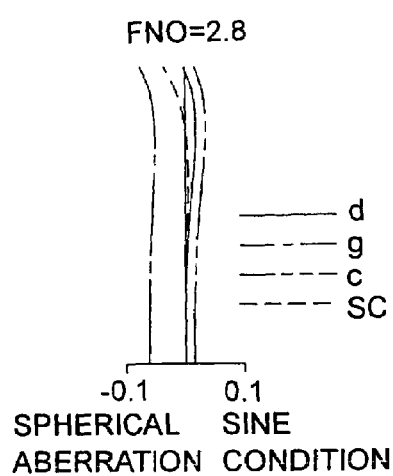
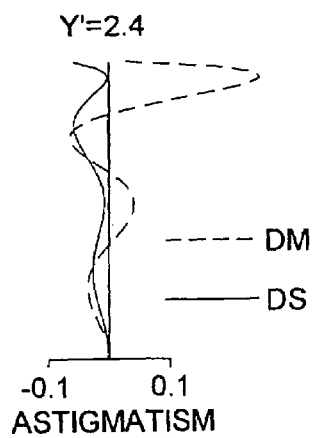
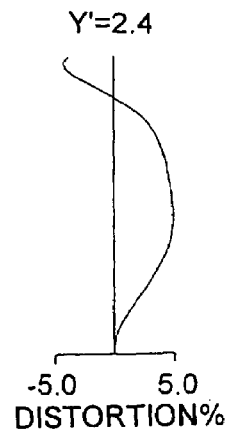
-0.1   0.1
SPHERICAL SINE
ABERRATION CONDITION
-0.1   0.1
ASTIGMATISM
-5.0   5.0
DISTORTION%

FNO=2.8
—— d
– – g
– - – c
- - - - SC
-0.1   0.1
SPHERICAL SINE
ABERRATION CONDITION

Y'=1.6
- - - - DM
—— DS
-0.1   0.1
ASTIGMATISM

Y'=1.6
-5.0   5.0
DISTORTION%

FNO=2.8
—— d
– – g
– - – c
- - - - SC
-0.1   0.1
SPHERICAL SINE
ABERRATION CONDITION

Y'=2.4
- - - - DM
—— DS
-0.1   0.1
ASTIGMATISM

Y'=2.4
-5.0   5.0
DISTORTION%

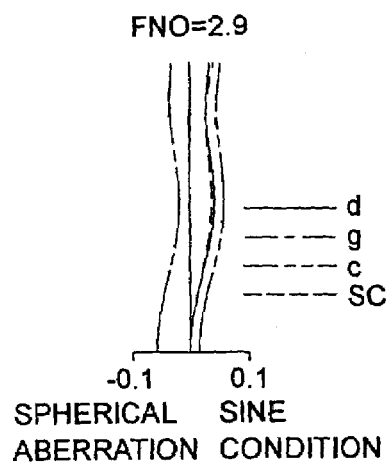
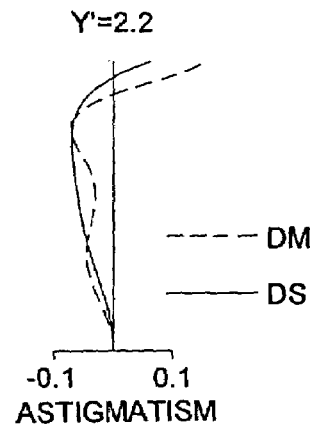
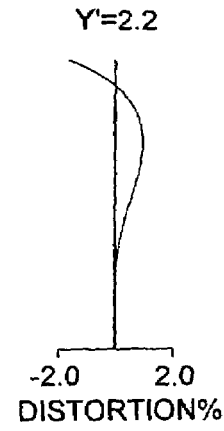
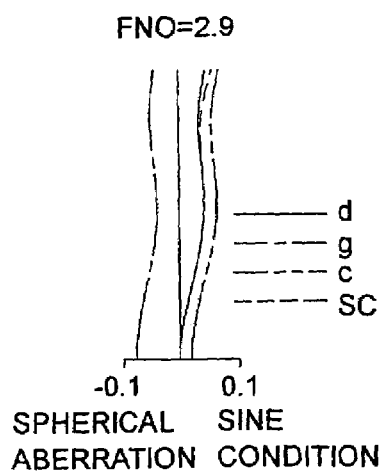
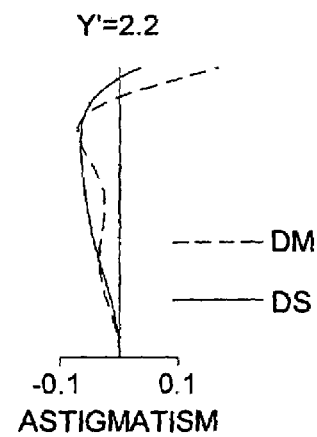
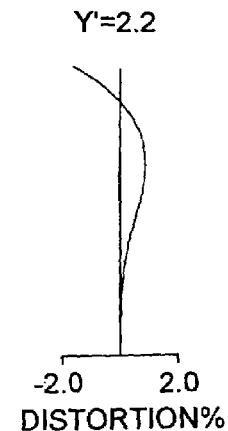

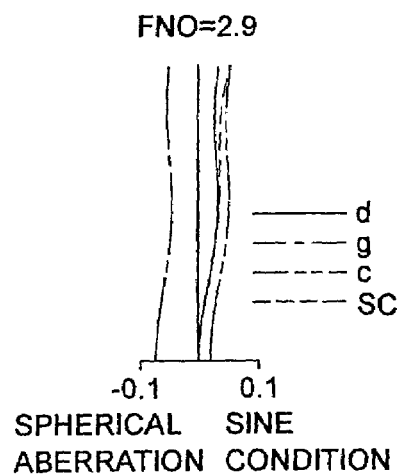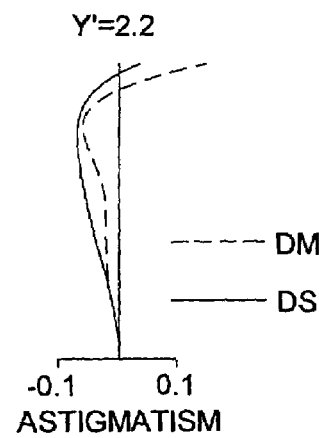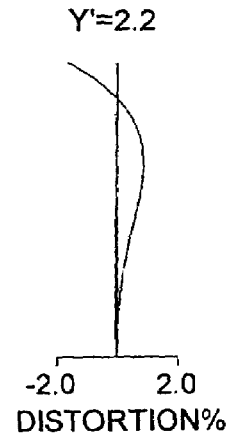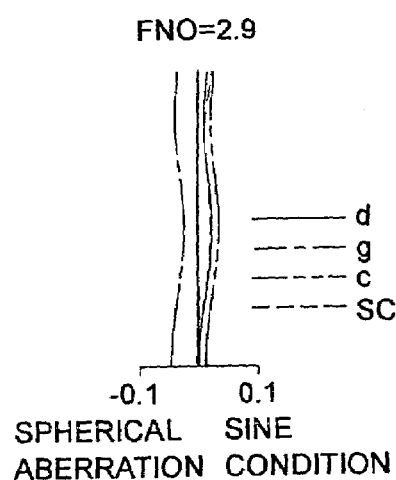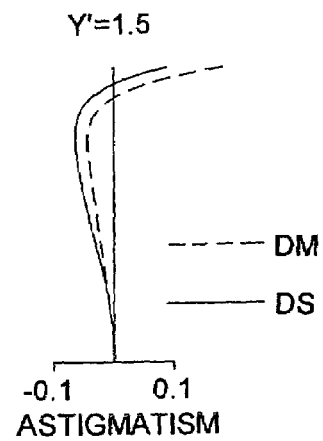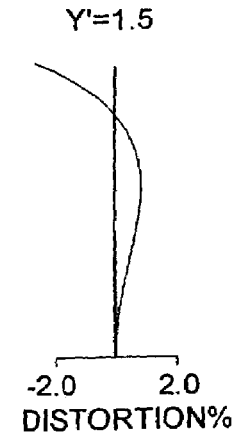

TAKING LENS SYSTEM

This application is based on the following Japanese Patent Applications, the contents of which are hereby incorporated by reference:

Japanese Patent Application No. 2001-361363 filed on Nov. 27, 2001
Japanese Patent Application No. 2002-220692 filed on Jul. 30, 2002
Japanese Patent Application No. 2002-220699 filed on Jul. 30, 2002
Japanese Patent Application No. 2002-272934 filed on Sep. 19, 2002
Japanese Patent Application No. 2002-272939 filed on Sep. 19, 2002

BACKGROUND OF THE INVENTION

1. Field of the Invention

The present invention relates to a taking lens system, and more particularly to a compact taking lens system suitable for use in a digital input device (such as a digital still camera or digital video camera) that takes in an image of a subject by means of a solid-state image sensor.

2. Description of the Prior Art

In recent years, as personal computers and the like become more and more popular, digital still cameras and digital video cameras (hereinafter collectively referred to as "digital cameras"), which permit easy entry of image data into digital equipment, have been becoming more and more popular for personal use among general users. Such digital cameras are expected to become even more widespread in the future.

Solid-state image sensors, such as CCDs (charge-coupled devices), used in digital cameras have been made increasingly small, and accordingly further miniaturization is sought in digital cameras themselves. As a result, miniaturization is eagerly sought also in taking lens systems, which occupy the largest volumes in digital input devices. The easiest way to make a taking lens system smaller is to make a solid-state image sensor smaller. However, this involves making photosensitive elements smaller, and thus makes the solid-state image sensor more difficult to fabricate, and in addition requires higher performance in the taking lens system.

On the other hand, making a taking lens system smaller while keeping the size of a solid-state image sensor unchanged inevitably brings the exit pupil position closer to the image plane. When the exit pupil position is brought closer to the image plane, the off-axial rays exiting from the taking lens system are obliquely incident on the image plane. This makes it impossible to make the most of the light-condensing ability of the microlenses provided in front of the solid-state image sensor, with the result that the obtained image shows extremely uneven brightness between in a central portion and in a peripheral portion thereof. This can be avoided by bringing the exit pupil position of the taking lens system farther away from the image plane, but this inevitably makes the taking lens system as a whole unduly large.

Moreover, in keen competition for lower prices in recent years, lower costs are increasingly eagerly sought in taking lens systems. To meet these requirements, Japanese Patent Application Laid-Open No. H6-88939 proposes a taking lens system composed of one lens element, and Japanese Patent Application Laid-Open No. H1-245211 proposes a taking lens system composed of two lens elements. Moreover, Japanese Patent Application Laid-Open No. 2001-183578 proposes a taking lens system composed of two lens elements for use with a solid-state image sensor. Furthermore, Japanese Patent Applications Laid-Open Nos. 2001-272598, 2002-698889, and H11-52227 propose taking lens systems composed of three lens elements.

These conventional taking lens systems, however, have the following disadvantages. The taking lens system composed of one lens element disclosed in Japanese Patent Application Laid-Open No. H6-88939 has the exit pupil position located far beyond the total length of the taking lens system, but suffers from poor image plane quality, and thus cannot maintain high imaging performance. The taking lens system composed of two lens elements disclosed in Japanese Patent Application Laid-Open No. H1-245211 offers good image plane quality, and thus maintains high imaging performance. However, here, the exit pupil position is located too close, namely at about 6/10 of the total length of the taking lens system. The taking lens system disclosed in Japanese Patent Application Laid-Open No. 2001-183578, in which the first lens element has a negative optical power and the second lens element has a positive optical power, has a long total length and is not compact.

The taking lens system composed of three lens elements disclosed in Japanese Patent Application Laid-Open No. 2001-272598, of which the total length is about three times its focal length, is not compact. The taking lens system disclosed in Japanese Patent Application Laid-Open No. 2002-698889, of which the total length is about twice its focal length, is compact, but uses two glass lens elements, which make it impossible to produce this taking lens system at low costs. The taking lens system disclosed in Japanese Patent Application Laid-Open No. H11-52227, of which the total length is about 2.5 times its focal length, is not compact. Moreover, here, the angle of view is about 40 degrees, which is too narrow to make this taking lens system usable.

SUMMARY OF THE INVENTION

An object of the present invention is to provide a high-optical-performance, low-cost, compact taking lens system for use with a solid-state image sensor To achieve the above object, according to one aspect of the present invention, a two-lens-element taking lens system for forming an image on a solid-state image sensor is provided with, from the object side: a positive lens element; and a meniscus lens element convex to the image side. Moreover, the following condition is fulfilled:

$$0.4 < D/f < 1.9 \tag{1}$$

where
 f represents the focal length of the taking lens system as a whole; and
 D represents the axial thickness from the object-side surface of the positive lens element to the image-side surface of the meniscus lens element.

According to another aspect of the present invention, a three-lens-element taking lens system for forming an image on a solid-state image sensor is provided with, from the object side: a first lens element having a weak optical power; an aperture stop; a second lens element having a positive optical power; and a third lens element having a concave surface on the image side thereof and having a negative optical power. Moreover, the following conditions are fulfilled:

$$|f/f1|<0.6 \tag{A0}$$

$$-2.2<f/f3<-0.79 \tag{A1}$$

where
  f represents the focal length of the taking lens system as a whole;
  f1 represents the focal length of the first lens element; and
  f3 represents the focal length of the third lens element.

According to another aspect of the present invention, a three-lens-element taking lens system for forming an image on a solid-state image sensor is provided with, from the object side: a first lens element having a positive optical power; an aperture stop; a second lens element having a positive optical power; and a third lens element having a negative optical power. Moreover, the following condition is fulfilled:

$$-2.6<f3/f1<0.15 \tag{A2}$$

where
  f1 represents the focal length of the first lens element; and
  f3 represents the focal length of the third lens element.

According to another aspect of the present invention, a three-lens-element taking lens system for forming an image on a solid-state image sensor is provided with, from the object side: a first lens element having a positive optical power; an aperture stop; a second lens element having a meniscus shape with a convex surface on the image side thereof and having a positive optical power; and a third lens element having a meniscus shape with a concave surface on the image side thereof and having a negative optical power. Moreover, the following condition is fulfilled:

$$0.05<T6/f<0.5 \tag{A3}$$

where
  T6 represents the axial lens thickness of the third lens element; and
  f represents the focal length of the taking lens system as a whole.

According to another aspect of the present invention, a three-lens-element taking lens system for forming an image on a solid-state image sensor is provided with, from the object side: a first lens element having a positive optical power; an aperture stop; a second lens element having a positive optical power; and a third lens element having a positive optical power. Moreover, the following condition is fulfilled:

$$0.2<f/f3<0.4 \tag{B1}$$

where
  f represents the focal length of the taking lens system as a whole; and
  f3 represents the focal length of the third lens element.

According to another aspect of the present invention, a three-lens-element taking lens system for forming an image on a solid-state image sensor provided with, from the object side: a first lens element having a meniscus shape with a convex surface on the object side thereof and having a positive optical power; an aperture stop; a second lens element having a meniscus shape with a convex surface on the image side thereof and having a positive optical power; and a third lens element having a meniscus shape with a convex surface on the image side thereof and having a positive optical power. Moreover, the following conditions are fulfilled:

$$0.05<T6/f<0.4 \tag{B3}$$

where
  T6 represents the axial lens thickness of the third lens element; and
  f represents the focal length of the taking lens system as a whole.

According to another aspect of the present invention, a two-lens-element taking lens system for forming an image on a solid-state image sensor is provided with, from the object side: a first lens element having a meniscus shape with a convex surface on the object side thereof and having a positive optical power; and a second lens element having a meniscus shape with a concave surface on the image side thereof. Moreover, the following condition is fulfilled:

$$|f2/f1|<25 \tag{I}$$

where
  f1 represents a focal length of the first lens element; and
  f2 represents a focal length of the second lens element.

According to another aspect of the present invention, a two-lens-element taking lens system for forming an image on a solid-state image sensor, comprising, from the object side: a first lens element having a meniscus shape with a convex surface on the object side thereof and having a positive optical power; and a second lens element having a meniscus shape with a concave surface on the image side thereof. Moreover, the following condition is fulfilled:

$$0.1<T1/f<0.5 \tag{II}$$

where
  T1 represents the axial lens thickness of the first lens element; and
  f represents the focal length of the taking lens system as a whole.

BRIEF DESCRIPTION OF THE DRAWINGS

This and other objects and features of the present invention will become clear from the following description, taken in conjunction with the preferred embodiments with reference to the accompanying drawings in which:

FIGS. 7A to 7C are aberration diagrams of Example 2;
FIGS. 8A to 8C are aberration diagrams of Example 3;
FIGS. 9A to 9C are aberration diagrams of Example 4;
FIGS. 10A to 10C are aberration diagrams of Example 5;

FIGS. 15A to 15C are aberration diagrams of Example 6;
FIGS. 16A to 16C are aberration diagrams of Example 7.

FIGS. 31A to 31C are aberration diagrams of Example 10;
FIGS. 32A to 32C are aberration diagrams of Example 11;
FIGS. 33A to 33C are aberration diagrams of Example 12;
FIGS. 34A to 34C are aberration diagrams of Example 13;
FIGS. 35A to 35C are aberration diagrams of Example 14;
FIGS. 36A to 36C are aberration diagrams of Example 15;
FIGS. 39A to 39C are aberration diagrams of Example 18;
FIGS. 40A to 40C are aberration diagrams of Example 19.

FIGS. 47A to 47C are aberration diagrams of Example 22;
FIGS. 48A to 48C are aberration diagrams of Example 23;
FIGS. 49A to 49C are aberration diagrams of Example 24;
FIGS. 50A to 50C are aberration diagrams of Example 25;

DESCRIPTION OF THE PREFERRED EMBODIMENTS

Hereinafter, taking lens systems embodying the present invention will be described with reference to the drawings.

First to Ninth Embodiments

Figure 1:
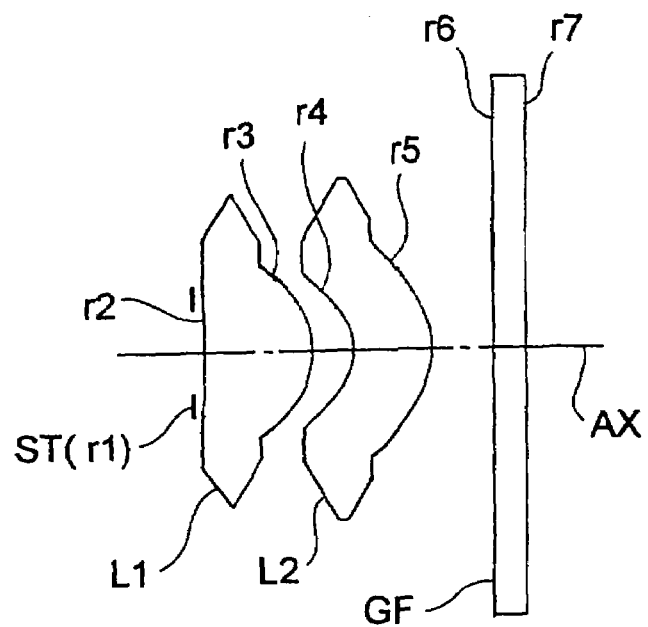
FIG. 1 is a lens construction diagram of a first embodiment (Example 1) of the invention.
Figure 2:
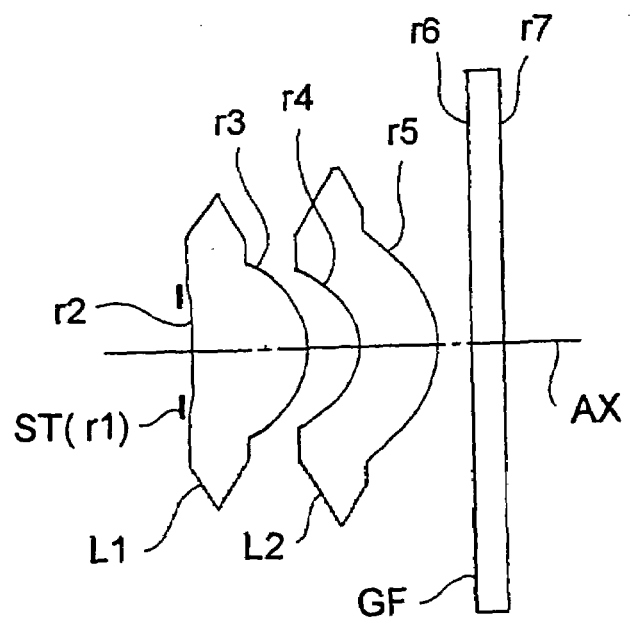
FIG. 2 is a lens construction diagram of a second embodiment (Example 2) of the invention.
Figure 3:
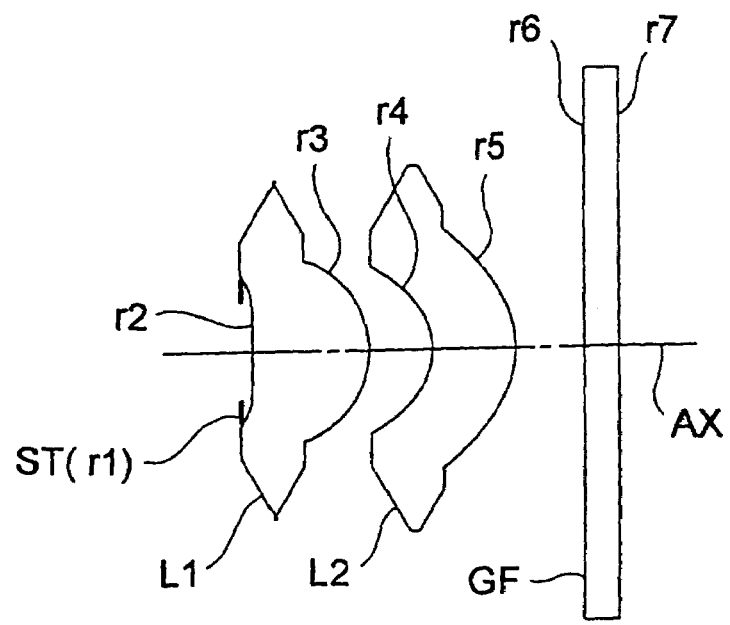
FIG. 3 is a lens construction diagram of a third embodiment (Example 3) of the invention.
Figure 4:
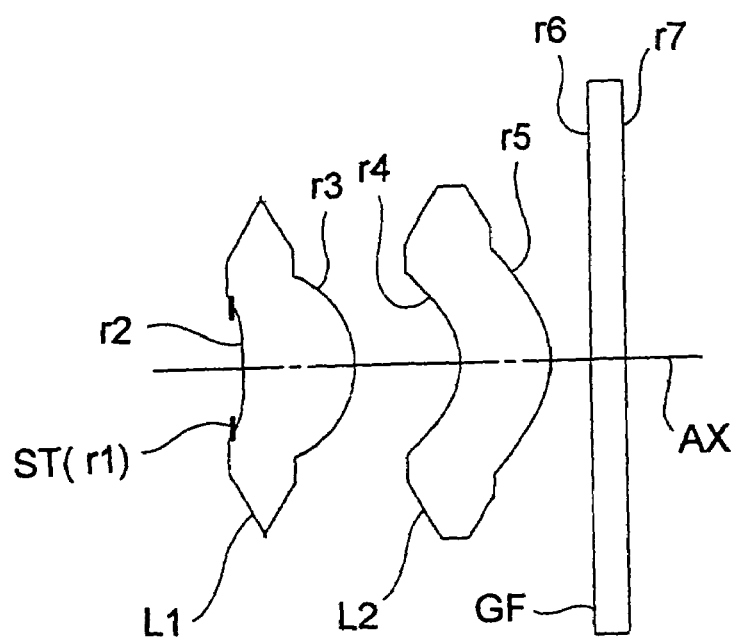
FIG. 4 is a lens construction diagram of a fourth embodiment (Example 4) of the invention.
Figure 5:
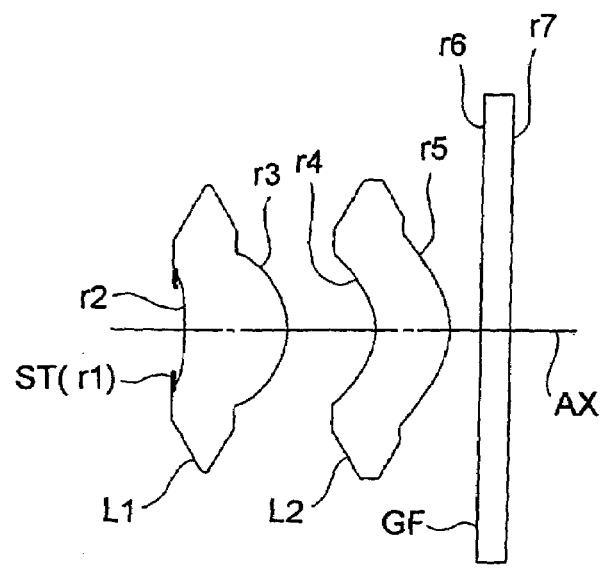
FIG. 5 is a lens construction diagram of a fifth embodiment (Example 5) of the invention.
Figure 11:
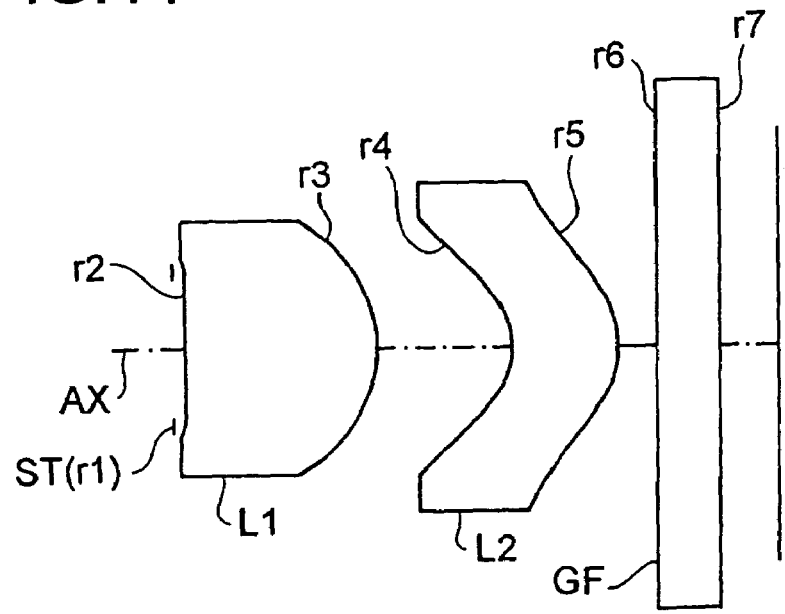
FIG. 11 is a lens construction diagram of a sixth embodiment (Example 6) of the invention.
Figure 12:
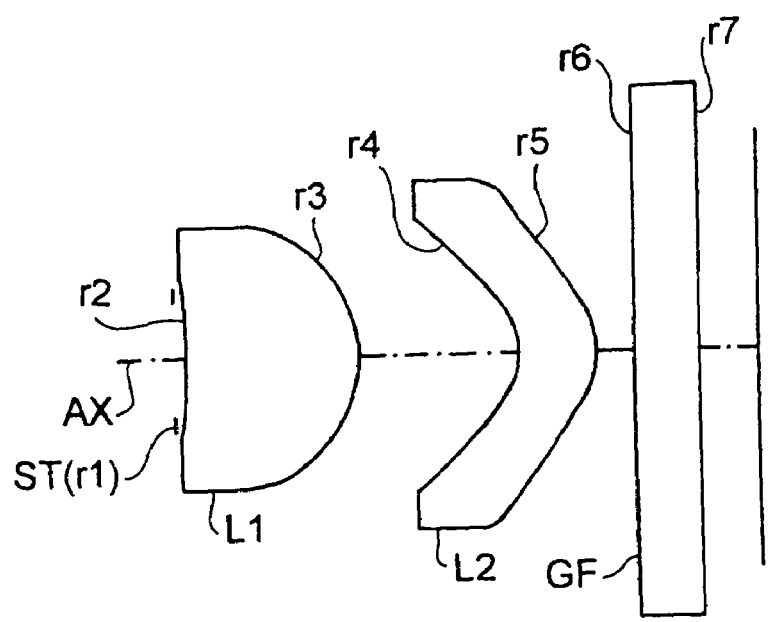
FIG. 12 is a lens construction diagram of a seventh embodiment (Example 7) of the invention.
Figure 13:
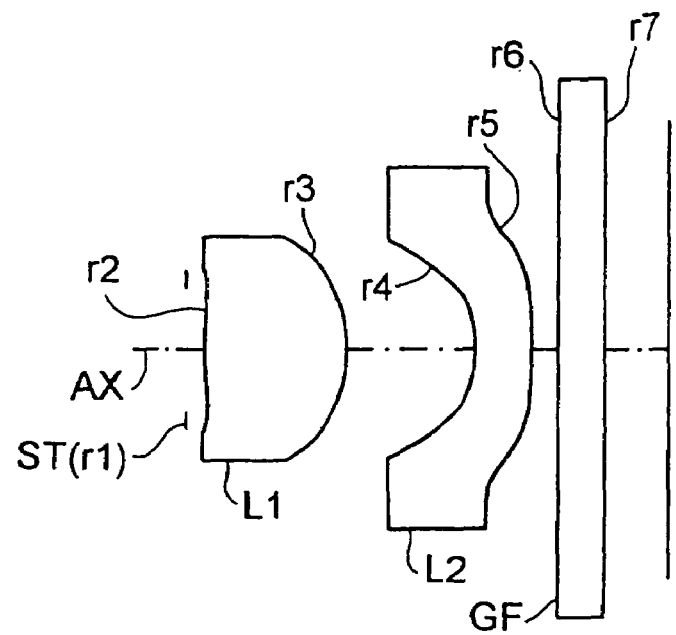
FIG. 13 is a lens construction diagram of an eighth embodiment (Example 8) of the invention.
Figure 14:
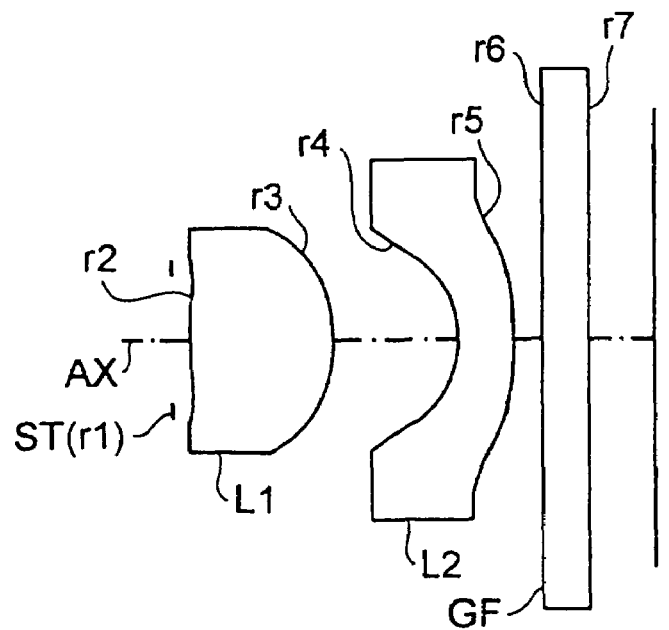
FIG. 14 is a lens construction diagram of a ninth embodiment (Example 9) of the invention.

First, a first to a ninth embodiment of the invention will be described. FIGS. 1 to 5 and FIGS. 11 to 14 show the lens constructions of the first to ninth embodiments, respectively, each showing the lens construction in an optical section. The taking lens systems of these embodiments are all designed as fixed-focal-length lens systems for photographing purposes (for example, for used in digital cameras) which form an optical image on a solid-state image sensor (for example, a CCD). Each of these taking lens systems is composed of, from the object side, an aperture stop ST, a positive lens element L1, and a meniscus lens element L2 convex to the image side, and has a glass filter GF, functioning as an optical low-pass filter or the like and having the shape of a plane parallel plate, provided on the image-plane side thereof. The two lens elements L1 and L2 are both plastic lens elements, and all the lens surfaces r2 to r5 are aspherical surfaces.

In a taking lens system of the type composed of two lens elements, namely, from the object side, a positive lens element L1 and a meniscus lens element L2 convex to the image side, by adopting a characteristic optical construction as will be described below, as in the first to ninth embodiments, it is possible to strike a proper balance among the exit pupil position, optical performance, costs, and Compactness required in a taking lens system for a solid-state image sensor. For example, with respect to the exit pupil position, it is preferable that, as in the first to ninth embodiments, the aperture stop ST be disposed on the object side of the positive lens element L1. Disposing the aperture stop ST on the object side of the positive lens element L1 makes it possible to locate the exit pupil farther away. Moreover, it is preferable that the lens element L1 have a convex surface on the image side. Giving the lens element L1 a convex surface on the image side is also effective in locating the exit pupil position farther away.

It is preferable that the positive lens element L1 and the meniscus lens element L2 be both plastic lens elements. Using plastic lens elements as both of the lens elements L1 and L2 is effective in reducing the costs of the taking lens system. It is preferable that the positive lens element L1 and the meniscus lens element L2 each have at least one aspherical surface. Giving each of the lens elements L1 and L2 at least one aspherical surface is highly effective in reducing spherical aberration, coma aberration, and distortion. More specifically, giving the positive lens element L1 an aspherical surface makes possible effective correction of spherical aberration and distortion, and giving the meniscus lens element L2 an aspherical surface makes possible effective correction of coma aberration.

Now, the conditions of which the fulfillment is preferable in the taking lens systems of the first to ninth embodiments will be described. It is to be noted, however, that, in any of these embodiments, it is not necessary that all of the conditions described below be fulfilled simultaneously; that is, the fulfillment of whichever of those conditions are appropriate in a given optical construction provides the corresponding benefits and advantages. Needless to say, from the viewpoint of optical performance, miniaturization, assembly, and other factors, it is preferable that as many of the conditions as possible be fulfilled.

It is preferable that condition (1) below be fulfilled.

$$0.4 < D/f < 1.9 \tag{1}$$

where f represents the focal length of the taking lens system as a whole; and

D represents the axial thickness from the object-side surface r2 of the positive lens element L1 to the image-side surface r5 of the meniscus lens element L2.

Condition (1) defines the range within which the distance D from the first lens surface r2 to the last lens surface r5 along the optical axis AX needs to be kept mainly to strike a proper balance between the total length and the aberrations produced. If the upper limit of condition (1) is transgressed, it is easy to correct aberrations, but the total length is unduly long. By contrast, if the lower limit of condition (1) is transgressed, it is easy to shorten the total length, but the aberrations produced, in particular distortion and curvature of field, are unduly large.

It is preferable that condition (2) below be fulfilled, and it is further preferable that condition (2a) below be fulfilled.

$$0.2<(R1+R2)/(R1-R2)<1.7 \quad (2)$$

$$0.5<(R1+R2)/(R1-R2)<1.7 \quad (2a)$$

where

R1 represents the radius of curvature of the object-side surface of the positive lens element L1 disposed at the object-side end; and R2 represents the radius of curvature of the image-side surface of the positive lens element L1 disposed at the object-side end.

Conditions (2) and (2a) define the ranges of which one needs to be observed with respect to the positive lens element L1 mainly to strike a proper balance of coma aberration. If the lower limit of condition (2) is transgressed, coma aberration is so large as to adversely affect lateral chromatic aberration. By contrast, if the upper limit of condition (2) is transgressed, coma aberration is so large as to adversely affect astigmatism.

It is preferable that condition (3) below be fulfilled, and it is further preferable that condition (3a) below be fulfilled.

$$-10<(R3+R4)/(R3-R4)<-1 \quad (3)$$

$$-9<(R3+R4)/(R3-R4)<-2 \quad (3a)$$

where

R3 represents the radius of curvature of the object-side surface of the meniscus lens element L2 disposed at the image-side end; and R4 represents the radius of curvature of the image-side surface of the meniscus lens element L2 disposed at the image-side end.

Conditions (3) and (3a) define the ranges of which one needs to be observed with respect to the meniscus lens element L2 mainly to strike a proper balance of coma aberration. If the lower limit of condition (3) is transgressed, coma aberration is so large as to adversely affect lateral chromatic aberration. By contrast, if the upper limit of condition (3) is transgressed, coma aberration is so large as to adversely affect astigmatism.

It is preferable that condition (4) below be fulfilled, and it is farther preferable that condition (4a) below be fulfilled.

$$1.05<f/f1<1.9 \quad (4)$$

$$1.1<f/f1<1.9 \quad (4a)$$

where f represents the focal length of the taking lens system as a whole; and f1 represents the focal length of the positive lens element L1 disposed at the object-side end.

Conditions (4) and (4a) define the ranges of which one needs to be observed with respect to the positive lens element L1 mainly to achieve proper correction of distortion and curvature of filed. If the upper limit of condition (4) is transgressed, positive distortion is unduly large, and the inclination of the image plane toward the over side is unduly sharp. In addition to these inconveniences, the exit pupil position is located unduly close. By contrast, if the lower limit of condition (4) is transgressed, negative distortion is unduly large, and the inclination of the image plane toward the under side is unduly sharp. This makes the taking lens system practically unusable.

It is preferable that condition (5) below be fulfilled, and it is further preferable that condition (5a) below be fulfilled.

$$-1.5<f/f2<0.5 \quad (5)$$

$$-0.4<f/f2<0.3 \quad (5a)$$

where f represents the focal length of the taking lens system as a whole; and f2 represents the focal length of the meniscus lens element L2 convex to the image side disposed at the image-side end.

Conditions (5) and (5a) define the ranges of which one needs to be observed with respect to the meniscus lens element L2 mainly to achieve proper correction of distortion and curvature of filed. If the lower limit of condition (5) is transgressed, positive distortion is unduly large, and the inclination of the image plane toward the over side is unduly sharp. In addition to these inconveniences, the exit pupil position is located unduly close. By contrast, if the upper limit of condition (5) is transgressed, negative distortion is unduly large, and the inclination of the image plane toward the under side is unduly sharp. This makes the taking lens system practically unusable.

Tenth to Twenty-First Embodiments

Figure 19:
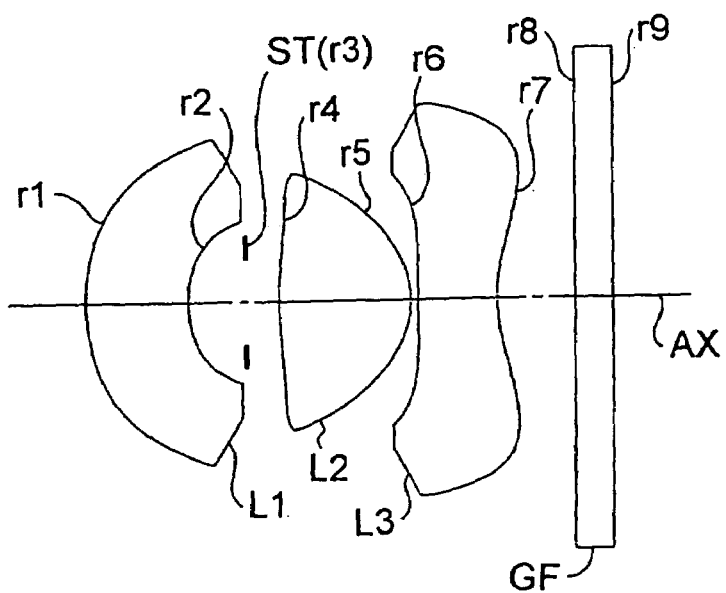
FIG. 19 is a lens construction diagram of a tenth embodiment (Example 10) of the invention.
Figure 20:
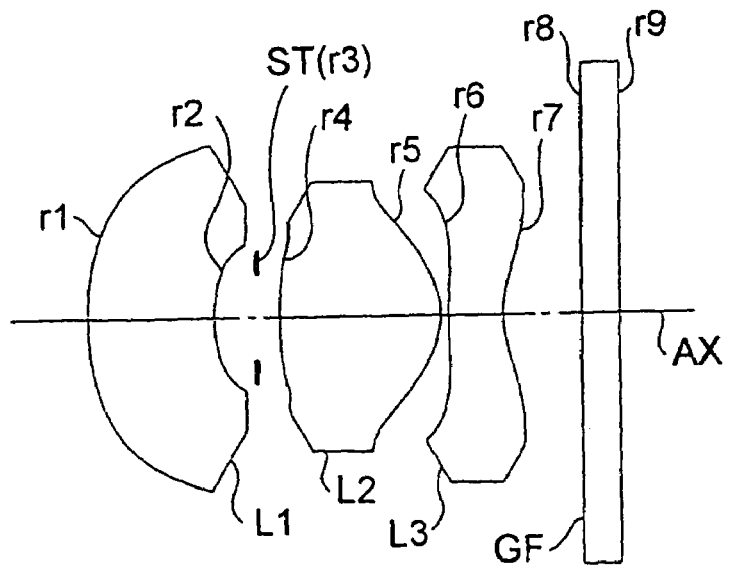
FIG. 20 is a lens construction diagram of an eleventh embodiment (Example 11) of the invention.
Figure 21:
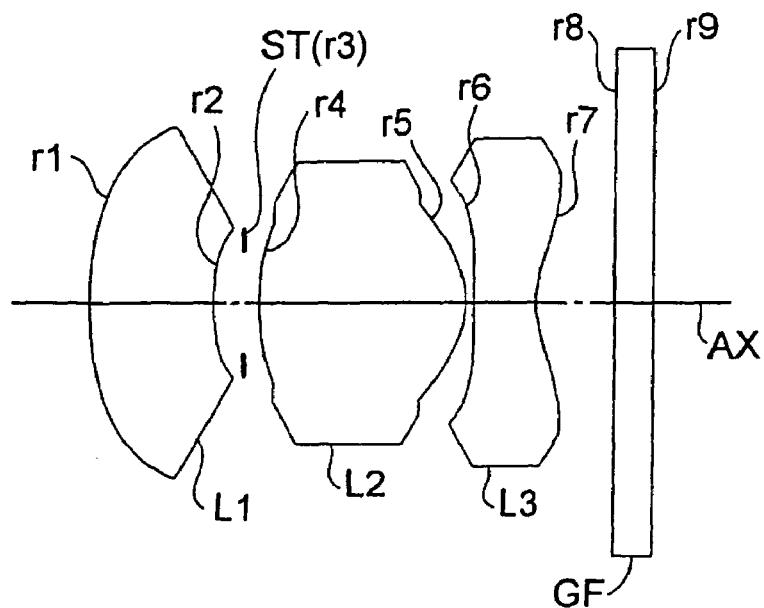
FIG. 21 is a lens construction diagram of a twelfth embodiment (Example 12) of the invention.
Figure 22:
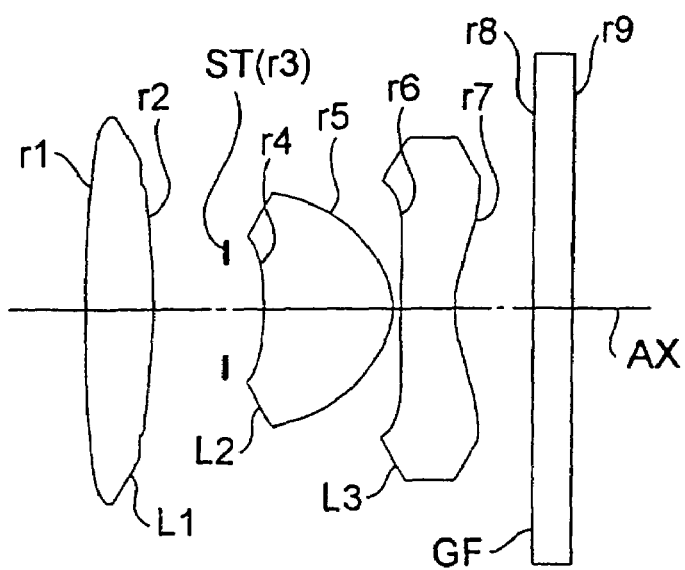
FIG. 22 is a lens construction diagram of a thirteenth embodiment (Example 13) of the invention.
Figure 23:
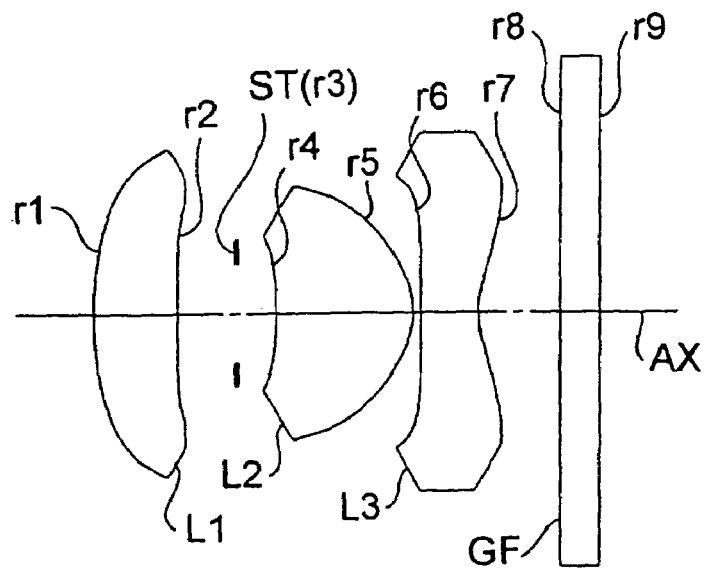
FIG. 23 is a lens construction diagram of a fourteenth embodiment (Example 14) of the invention.
Figure 24:
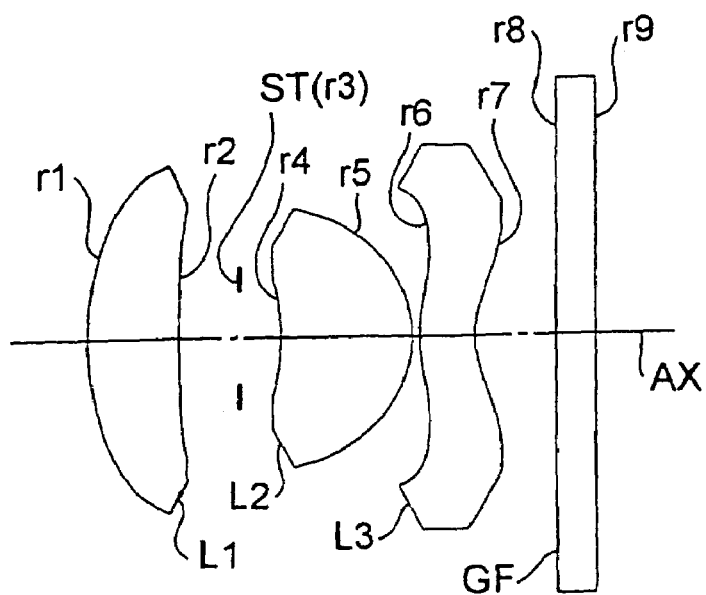
FIG. 24 is a lens construction diagram of a fifteenth embodiment (Example 15) of the invention.
Figure 25:
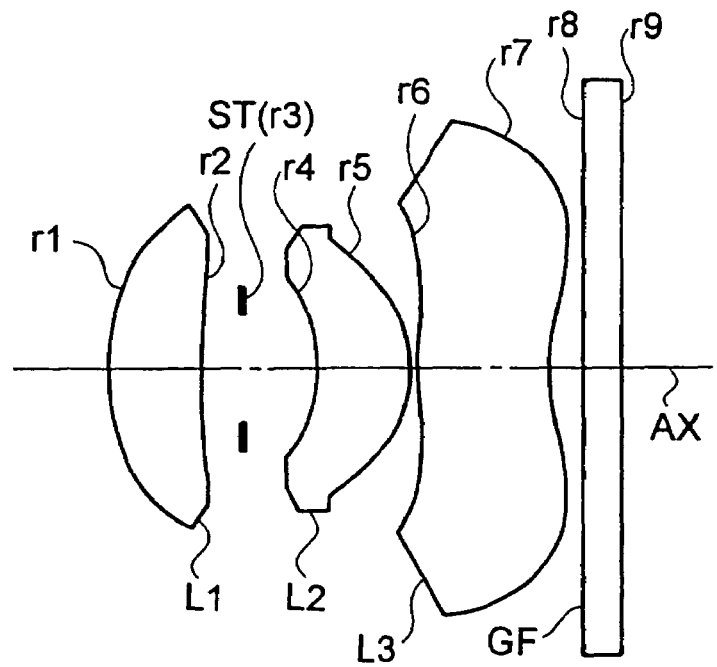
FIG. 25 is a lens construction diagram of a sixteenth embodiment (Example 16) of the invention.
Figure 26:
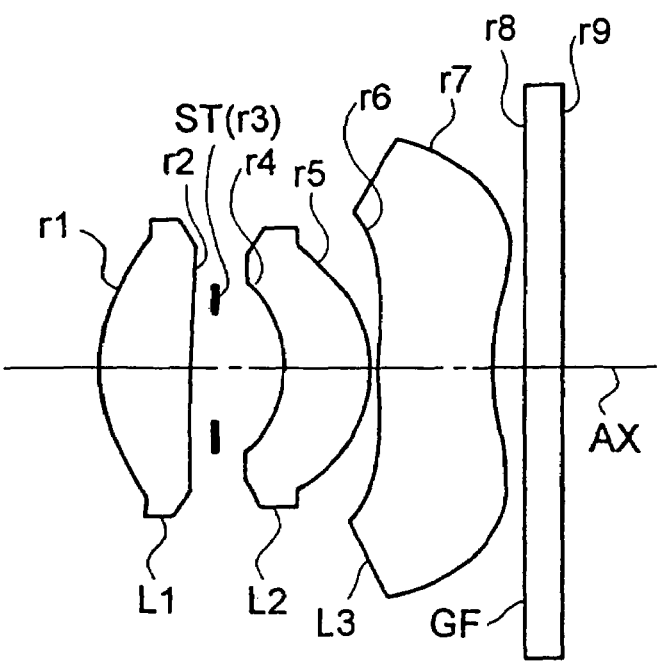
FIG. 26 is a lens construction diagram of a seventeenth embodiment (Example 17) of the invention.
Figure 27:
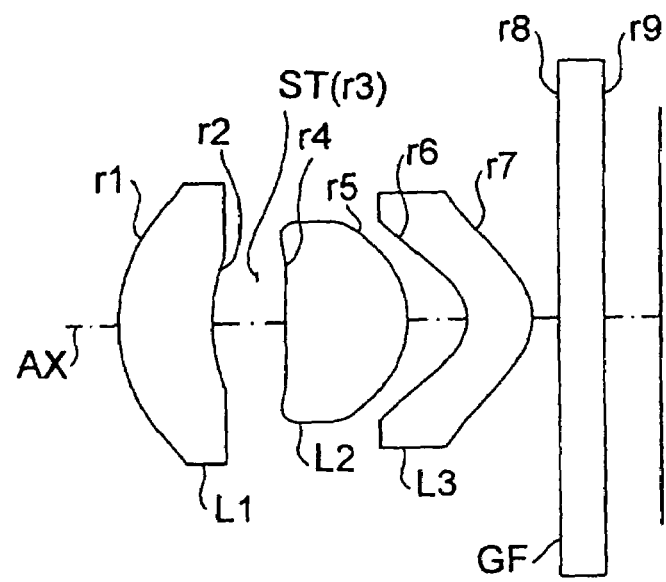
FIG. 27 is a lens construction diagram of an eighteenth embodiment (Example 18) of the invention.
Figure 28:
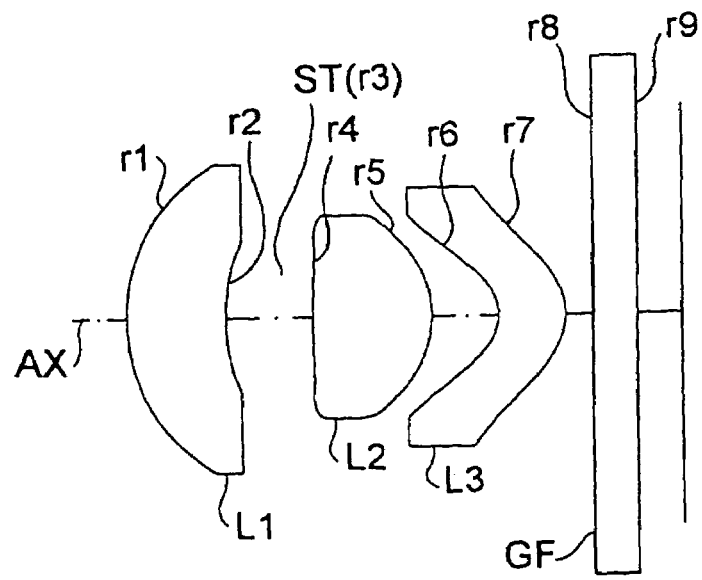
FIG. 28 is a lens construction diagram of a nineteenth embodiment (Example 19) of the invention.
Figure 29:
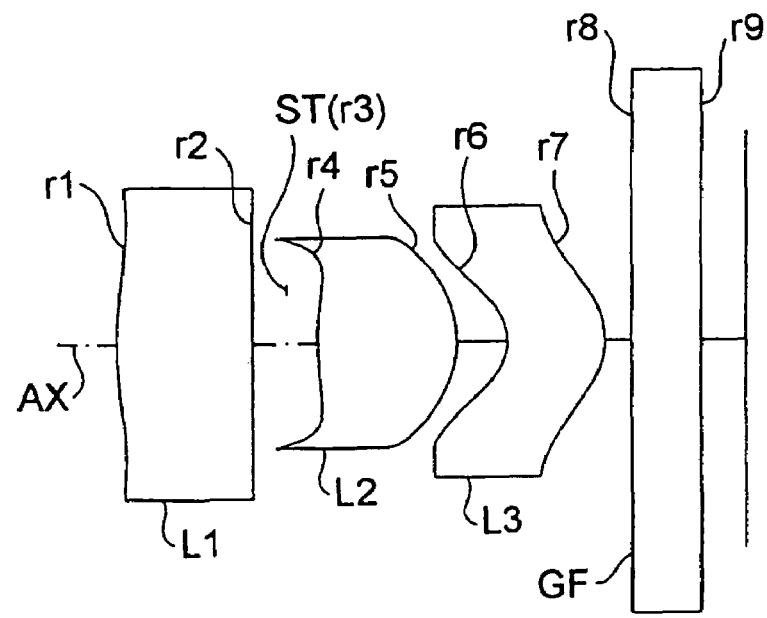
FIG. 29 is a lens construction diagram of a twentieth embodiment (Example 20) of the invention.
Figure 30:
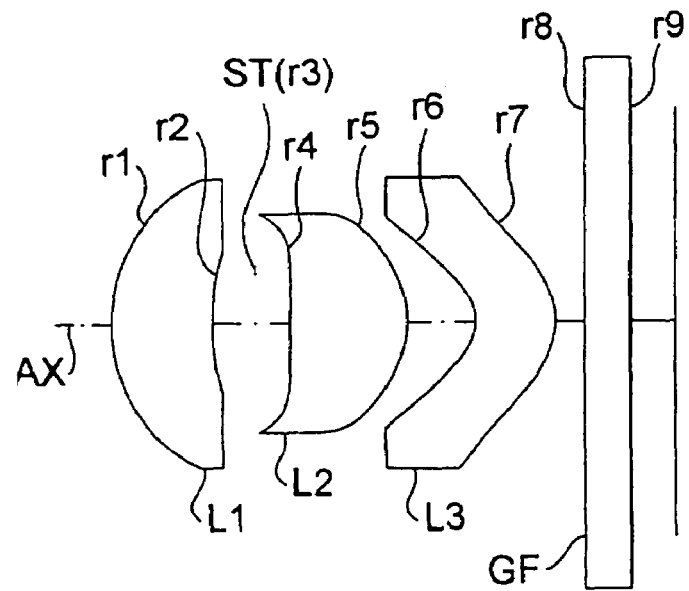
FIG. 30 is a lens construction diagram of twenty-first embodiment (Example 21) of the invention.

Next, a tenth to a twenty-first embodiment of the invention will be described. FIGS. 19 to 30 show the lens constructions of the tenth to twenty-first embodiments, respectively, each showing the lens construction in an optical section. The taking lens systems of these embodiments are all designed as fixed-focal-length lens systems for photographing purposes (for example, for used in digital cameras) which form an optical image on a solid-state image sensor (for example, a CCD). Each of these taking lens systems is composed of three lens elements, namely, from the object side, a first lens element L1, an aperture stop ST, a second lens element L2, and a third lens element L3. The three lens elements L1 to L3 are all plastic lens elements, and all the lens surfaces r1, r2, and r4 to r7 are aspherical surfaces. In addition, on the image side of the third lens element L3 is disposed a glass filter GF functioning as an optical low-pass filter or the like and having the shape of a plane parallel plate.

In the tenth to fourteenth embodiments (FIGS. 19 to 23), the taking lens system is composed of, from the object side, a first lens element L1 having a weak negative or positive optical power (here, the optical power is the quantity defined as the reciprocal of the focal length), an aperture stop ST, a second lens element L2 having a positive optical power, a third lens element L3 having a negative optical power, and a glass filter GF. In the fifteenth to seventeenth embodiments (FIGS. 24 to 26), the taking lens system is composed of, from the object side, a first lens element L1 having a positive optical power, an aperture stop ST, a second lens element L2 having a positive optical power, a third lens element L3 having a negative optical power, and a glass filter GF. In the eighteenth to twenty-first embodiments (FIGS. 27 to 30), the taking lens system is composed of, from the object side, a first lens element L1 having a positive optical power, an aperture stop ST, a second lens element L2 having a positive optical power, a third lens element L3 having a positive optical power, and a glass filter GF. Now, the features of each of the tenth to twenty-first embodiments will be described. It is to be noted that, in the following descriptions, the three-lens-element construction having a negative/positive-positive-negative (−/+, +, −) power arrangement (here, "/" signifies "or") adopted in the tenth to seventeenth embodiments will be referred to as "lens type A," and the three-lens-element construction having a positive-positive-positive (+, +, +) power arrangement adopted in the eighteenth to twenty-first embodiments will be referred to as "lens type B."

Lens Type A (Negative/Positive-Positive-Negative)

In the tenth to twelfth embodiments (FIGS. 19 to 21), the first lens element L1 has a meniscus shape with a convex surface on the object side, and has a weak negative optical power; the second lens element L2 has a biconvex shape, and has a positive optical power; the third lens element L3 has a meniscus shape with a concave surface on the image side, and has a negative optical power. That is, there are arranged, from the object side, a weakly negatively powered meniscus lens element as the first lens element L1, then the aperture stop ST, then a biconvex positive lens element as the second lens element L2, and then a negative meniscus lens element concave to the image side as the third lens element L3. In this way, it is possible to build a taking lens system of lens type A having a negative-positive-negative (−, +, −) power arrangement while striking a proper balance among optical performance, costs, and compactness.

In the thirteenth and fourteenth embodiments (FIGS. 22 to 23), the first lens element L1 has a weak positive optical power; the second lens element L2 has a meniscus shape with a convex surface on the image side, and has a positive optical power; the third lens element L3 has a meniscus shape with a concave surface on the image side, and has a negative optical power. That is, there are arranged, from the object side, a weakly positively powered lens element as the first lens element L1, then the aperture stop ST, then a positive meniscus lens element convex to the image side as the second lens element L2, and then a negative meniscus lens element concave to the image side as the third lens element L3. In this way, it is possible to build a taking lens system of lens type A having a positive-positive-negative (+, +, −) power arrangement while striking a proper balance among optical performance, costs, and compactness.

In the fifteenth and seventeenth embodiments (FIGS. 24 to 26), the first lens element L1 has a positive optical power; the second lens element L2 has a meniscus shape with a convex surface on the image side, and has a positive optical power; the third lens element L3 has a meniscus shape with a concave surface on the image side, and has a negative optical power. That is, there are arranged, from the object side, a positive lens element as the first lens element L1, then the aperture stop ST, then a positive meniscus lens element convex to the image side as the second lens element L2, and then a negative meniscus lens element concave to the image side as the third lens element L3. In this way, it is possible to build a taking lens system of lens type A having a positive-positive-negative (+, +, −) power arrangement while striking a proper balance among optical performance, costs, and compactness.

Now, the conditions of which the fulfillment is preferable in taking lens systems of lens type A will be described. It is to be noted, however, that, in any given optical construction, it is not necessary that all of the conditions described below be fulfilled simultaneously; that is, the fulfillment of whichever of those conditions are appropriate in a given optical construction provides the corresponding benefits and advantages. Needless to say, from the viewpoint of optical performance, miniaturization, assembly, and other factors, it is preferable that as many of the conditions as possible be fulfilled.

In the tenth to fourteenth embodiments, the first lens element L1 has a weak optical power. It is preferable that this weak optical power fulfill condition (A0) below:

$$|f/f1|<0.6 \tag{A0}$$

where f represents the focal length of the taking lens system as a whole; and f1 represents the focal length of the first lens element L1.

Condition (A0) defines the range that needs to be observed with respect to the first lens element L1 having a weak optical power mainly to minimize degradation in optical performance ascribable to fabrication-associated errors. When condition (A0) is not fulfilled, the optical power of the first lens element L1 is so strong that the large aberrations produced by the first lens element L1 needs to be corrected by the second L2 and following lens elements. This aggravates degradation in optical performance ascribable to fabrication-associated errors.

With respect to the third lens element L3, it is preferable that condition (A1) below be fulfilled, and it is further preferable that this condition be fulfilled together with condition (A0) noted above.

$$-2.2<f/f3<0.79 \tag{A1}$$

where f represents the focal length of the taking lens system as a whole; and f3 represents the focal length of the third lens element L3.

Condition (A1) defines the range that needs to be observed with respect to the third lens element L3 mainly to strike a proper balance of coma aberration. If the lower limit of condition (A1) is transgressed, coma aberration is so large as to adversely affect lateral chromatic aberration. By contrast, if the upper limit of condition (A1) is transgressed, coma aberration is so large as to adversely affect astigmatism.

In an optical construction of lens type A having a positive-positive-negative (+, +, −) power arrangement, as in the thirteenth to seventeenth embodiments, with respect to the first and third lens elements L1 and L3, it is preferable that condition (A2) below be fulfilled, and it is further preferable that condition (A2a) below be fulfilled. It is particularly preferable that condition (A2b) below be fulfilled.

$$-2.6<f3/f1<-0.15 \tag{A2}$$

$$-1.1<f3/f1<-0.15 \tag{A2a}$$

$$-0.35<f3/f1<-0.15 \tag{A2b}$$

where f1 represents the focal length of the first lens element L1; and f3 represents the focal length of the third lens element L3.

Conditions (A2), (A2a), and (A2b) define the ranges of which one needs to be observed mainly to strike a proper balance between the total length and the aberrations produced. If the upper limit of condition (A2) is transgressed, it is easy to correct aberrations, but the total length is unduly long. By contrast, if the lower limit of condition (A2) is transgressed, it is easy to shorten the total length, but the aberrations produced, in particular distortion and curvature of field, are unduly large.

With respect to the third lens element L3, it is preferable that condition (A3) below be fulfilled, and it is further preferable that condition (A3a) below be fulfilled. It is particularly preferable that one of these conditions be fulfilled together with at least one of conditions (A0), (A1), (A2), (A2a), and (A2b) noted above; In an optical construction of lens type A having a positive-positive-negative (+, +, −) power arrangement, as in the thirteenth to seventeenth embodiments, it is preferable that the second lens element L2 have a positive meniscus shape with a convex surface on the image side, that the third lens element L3 have a negative meniscus shape with a concave surface on the image side, and in addition that condition (A3) below be fulfilled. In this case, it is further preferable that condition (A3a) below be fulfilled.

$$0.05 < T6/f < 0.5 \quad (A3)$$

$$0.05 < T6/f < 0.4 \quad (A3a)$$

where

T6 represents the axial lens thickness of the third lens element L3; and f represents the focal length of the taking lens system as a whole.

Conditions (A3) and (A3a) define the ranges of which one needs to be observed with respect to the third lens element L3 mainly to strike a proper balance between the lateral chromatic aberration produced and the manufacturability of the lens element. If the upper limit of condition (A3) is transgressed, it is difficult to correct lateral chromatic aberration properly. By contrast, if the lower limit of condition (A3) is transgressed, the lens element is too thin to be manufactured easily.

Lens Type B (Positive-Positive-Positive)

In the eighteenth to twenty-first embodiments (FIGS. 27 to 30), the first lens element L1 has a meniscus shape with a convex surface on the object side, and has a positive optical power; the second lens element L2 has a meniscus shape with a convex surface on the image side, and has a positive optical power; the third lens element L3 has a meniscus shape with a convex surface on the image side, and has a positive optical power. That is, there are arranged, from the object side, a positive meniscus lens element convex to the object side as the first lens element L1, then the aperture stop ST, then a positive lens element convex to the image side as the second lens element L2, and then a positive meniscus lens element convex to the image side as the third lens element L3. In this way, it is possible to build a taking lens system of lens type B while striking a proper balance among optical performance, costs, and compactness.

Now, the conditions of which the fulfillment is preferable in taking lens systems of lens type B will be described. It is to be noted, however, that, in any given optical construction, it is not necessary that all of the conditions described below be fulfilled simultaneously; that is, the fulfillment of whichever of those conditions are appropriate in a given optical construction provides the corresponding benefits and advantages. Needless to say, from the viewpoint of optical performance, miniaturization, assembly, and other factors, it is preferable that as many of the conditions as possible be fulfilled.

With respect to the third lens element L3, it is preferable that condition (B1) below be fulfilled.

$$0.2 < f/f3 < 0.4 \quad (B1)$$

where f represents the focal length of the taking lens system as a whole; and f3 represents the focal length of the third lens element L3.

Condition (B1) defines the range that needs to be observed with respect to the third lens element L3 mainly to strike a proper balance of coma aberration. If the lower limit of condition (B1) is transgressed, coma aberration is so large as to adversely affect lateral chromatic aberration. By contrast, if the upper limit of condition (B1) is transgressed, coma aberration is so large as to adversely affect astigmatism.

With respect to the first and third lens elements L1 and L3, it is preferable that condition (B2) below be fulfilled.

$$0.5 < f3/f1 < 2.6 \quad (B2)$$

where f1 represents the focal length of the first lens element L1; and f3 represents the focal length of the third lens element L3.

Condition (B2) defines the range that needs to be observed mainly to strike a proper balance between the total length and the aberrations produced. If the upper limit of condition (B2) is transgressed, it is easy to correct aberrations, but the total length is unduly long. By contrast, if the lower limit of condition (B2) is transgressed, it is easy to shorten the total length, but the aberrations produced, in particular distortion and curvature of field, are unduly large.

With respect to the third lens element L3, it is preferable that condition (B3) below be fulfilled. It is further preferable that condition (B3) below be fulfilled in a three-lens-element construction of lens type B in which the first lens element L1 is a positive meniscus lens element with a convex surface on the object side, the second lens element L2 is a positive lens element with a convex surface on the image side, and the third lens element L3 is a positive meniscus lens element with a convex surface on the image side.

$$0.05 < T6/f < 0.4 \quad (B3)$$

where

T6 represents the axial lens thickness of the third lens element L3; and f represents the focal length of the taking lens system as a whole.

Condition (B3) defines the range that needs to be observed with respect to the third lens element L3 mainly to strike a proper balance between the lateral chromatic aberration produced and the manufacturability of the lens element. If the upper limit of condition (B3) is transgressed, it is difficult to correct lateral chromatic aberration properly. By contrast, if the lower limit of condition (B3) is transgressed, the lens element is too thin to be manufactured easily.

Features Preferable in Both Lens Types A and B

As described earlier, in the tenth to twenty-first embodiments, the first to third lens elements L1 to L3 are all plastic lens elements, and all the lens surfaces r1, r2, and r4 to r7 are aspherical surfaces. In this way, it is preferable that all the lens elements L1 to L3 be plastic lens elements, and that each of the lens elements L1 to L3 is given at least one aspherical surface. Using plastic lens elements as all of the lens elements L1 to L3 is effective in reducing the costs of the taking lens system. On the other hand, giving each of the lens elements L1 to L3 at least one aspherical surface is highly effective in reducing spherical aberration, coma aberration, and distortion.

Twenty-Second to Twenty-Fifth Embodiments

Figure 43:
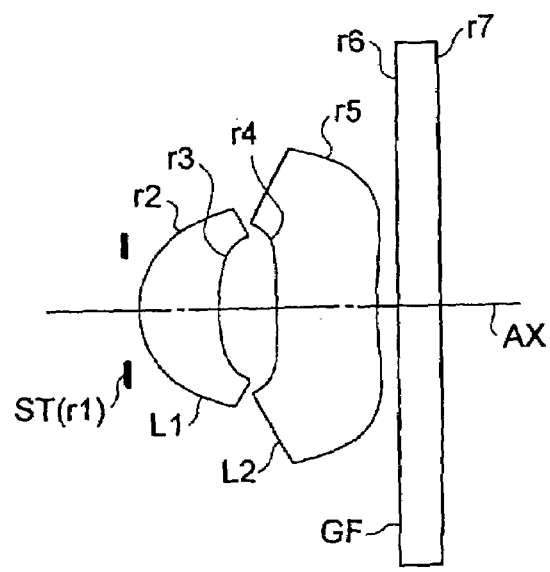
FIG. 43 is a lens construction diagram of a twenty-second embodiment (Example 22) of the invention.
Figure 44:
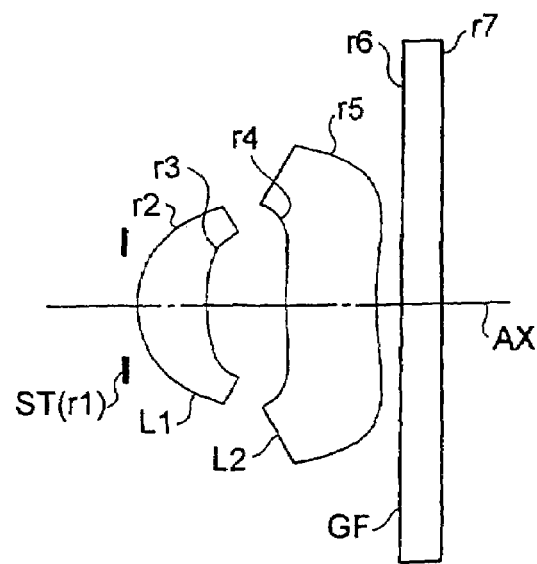
FIG. 44 is a lens construction diagram of a twenty-third embodiment (Example 23) of the invention.
Figure 45:
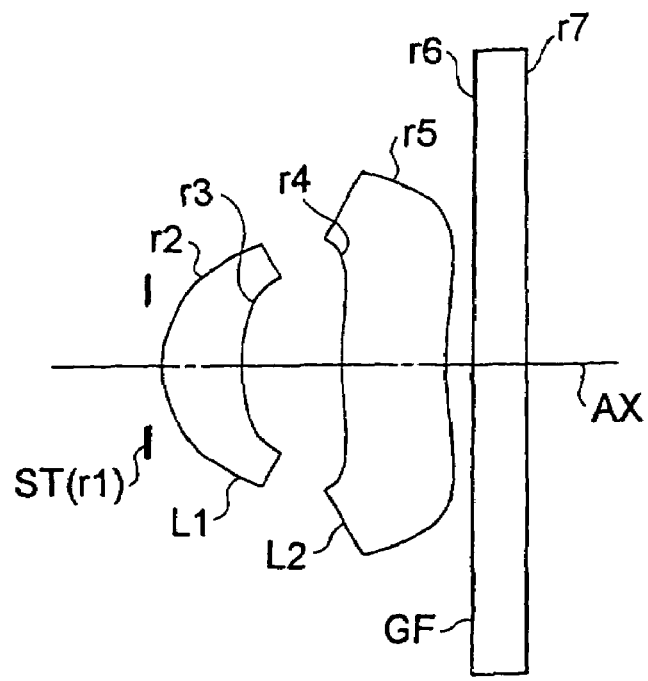
FIG. 45 is a lens construction diagram of a twenty-fourth embodiment (Example 24) of the invention.
Figure 46:
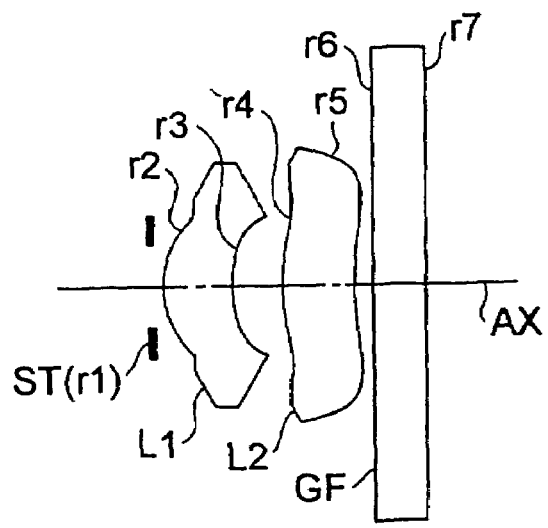
FIG. 46 is a lens construction diagram of a twenty-fifth embodiment (Example 25) of the invention.

Next, a twenty-second to a twenty-fifth embodiment of the invention will be described. FIGS. 43 to 46 show the lens constructions of the twenty-second to twenty-fifth embodiments, respectively, each showing the lens construction in an optical section. The taking lens systems of these embodiments are all designed as fixed-focal-length lens systems for photographing purposes (for example, for used in digital cameras) which form an optical image on a solid-state image sensor (for example, a CCD). Each of these taking lens systems is composed of two lens elements, namely, from the object side, an aperture stop ST, a first lens element L1 having a meniscus shape with a convex surface on the object side and having a positive optical power, and a second lens element L2 having a meniscus shape with a concave surface on the image side, and has a glass filter GF, functioning as an optical low-pass filter or the like and having the shape of a plane parallel plate, provided on the image-plane side thereof. In the twenty-second embodiment, the second lens element L2 is a plastic lens. In the twenty-third to twenty-fifth embodiments, the first and second lens elements L1 and L2 are both plastic lens elements. In the twenty-second to twenty-fifth embodiments, all the lens surfaces r2 to r5 are aspherical surfaces.

Thus, in the twenty-second to twenty-fifth embodiments, a taking lens system having a positive-positive/negative (+, +/−) power arrangement (here, the optical power is the quantity defined as the reciprocal of the focal length, and "/" signifies "or") is built by arranging two lens elements, namely, from the object side, a positive meniscus lens element L1 with a convex surface on the object side and then a meniscus lens element with a concave surface on the image side. In this way, it is possible to strike a proper balance among the exit pupil position, optical performance, costs, and compactness required in a taking lens system for a solid-state image sensor. Specifically, that can be achieved effectively when the conditions described below are fulfilled.

Now, the conditions that need to be fulfilled in the taking lens systems of the twenty-second to twenty-fifth embodiments, i.e., the conditions of which the fulfillment is preferable in taking lens systems of the types like those of the twenty-second to twenty-fifth embodiments, will be described. It is to be noted, however, that, in any of these embodiments, it is not necessary that all of the conditions described below be fulfilled simultaneously; that is, the fulfillment of whichever of those conditions are appropriate in a given optical construction provides the corresponding benefits and advantages. Needless to say, from the viewpoint of optical performance, miniaturization, assembly, and other factors, it is preferable that as many of the conditions as possible be fulfilled.

It is preferable that condition (I) below be fulfilled.

$$|f2|/f1 < 25 \tag{I}$$

where f1 represents the focal length of the first lens element L1; and f2 represents the focal length of the second lens element L2.

Condition (I) defines the range that needs to be observed mainly to strike a proper balance between the total length and the aberrations produced. If the upper limit of condition (I) is transgressed, the optical power of the second lens element L2 is so weak that, while it is easy to correct aberrations, the total length is unduly long.

It is preferable that condition (II) below be fulfilled.

$$0.1 < T1/f < 0.5 \tag{II}$$

where

T1 represents the axial lens thickness of the first lens element L1; and f represents the focal length of the taking lens system as a whole.

Condition (II) defines the range that needs to be observed with respect to the first lens element L1 mainly to strike a proper balance between the lateral chromatic aberration produced and the manufacturability of the lens element. If the upper limit of condition (II) is transgressed, it is difficult to correct lateral chromatic aberration properly. By contrast, if the lower limit of condition (II) is transgressed, the lens element is too thin at the edge to be manufactured easily.

It is preferable that condition (III) below be fulfilled, and it is further preferable that this condition be fulfilled together with at least one of conditions (I) and (II) noted above.

$$1.4 < f/Y' < 1.9 \tag{III}$$

where f represents the focal length of the taking lens system as a whole; and

Y' represents the maximum image height.

Condition (III) defines the range that needs to be observed to strike a proper balance between the total length of the taking lens system and the front lens diameter. If the lower limit of condition (III) is transgressed, the front lens diameter is so large that the dimension, in the diametrical direction, of the taking lens device incorporating the taking lens system is unduly large and that it is difficult to correct distortion. By contrast, if the upper limit of condition (III) is transgressed, the total length of the taking lens system is so long that the dimension, in the axial (AX) direction, of the taking lens device incorporating the taking lens system is unduly large.

It is preferable that condition (IV) below be fulfilled, and it is further preferable that this condition be fulfilled together with at least one of conditions (I) to (III) noted above.

$$V2 > 40 \tag{IV}$$

where

V2 represents the Abbe number of the second lens element L2.

Condition (IV) defines the range that needs to be observed with respect to the correction of chromatic aberration by the second lens element L2. If condition (IV) is not fulfilled, the correction of chromatic aberration by the second lens element L2 is unsatisfactory, aggravating the chromatic aberration produced through the taking lens system as a whole.

It is preferable that condition (V) below be fulfilled, and it is further preferable that this condition be fulfilled together with at least one of conditions (I) to (IV) noted above.

$$0.13 < TA/f < 0.41 \tag{V}$$

where

TA represents the axial aerial distance between the first lens element L1 and the second lens element L2; and f represents the focal length of the taking lens system as a whole.

Condition (V) defines the range that needs to be observed to strike a proper balance between the total length and the aberrations produced. If the upper limit of condition (V) is transgressed, it is easy to correct aberrations, but the total length is unduly long. By contrast, if the lower limit of condition (V) is transgressed, it is easy to shorten the total length, but the aberrations produced, in particular distortion and curvature of field, are unduly large.

It is preferable that, as in the twenty-second to twenty-fifth embodiments, the aperture stop ST be disposed on the object side of the first lens element L1. Disposing the aperture stop ST on the object side of the first lens element L1 makes it possible to locate the exit pupil farther away. Moreover, in the twenty-second to twenty-fifth embodiments, plastic lens elements and aspherical surfaces are used. Here, it is preferable that the first and second lens elements L1 and L2 be both plastic lens elements, and that the first and second lens elements L1 and L2 each have at least one aspherical surface. Using plastic lens elements as both of the lens elements L1 and L2 is effective in reducing the costs of the taking lens system. Giving each of the lens elements L1 and L2 at least one aspherical surface is highly effective in reducing spherical aberration, coma aberration, and distortion:

Possible Modifications

In any of the first to twenty-fifth embodiments, the taking lens system is composed solely of refractive lens elements, which deflect incident light by refraction (i.e. lens elements of the type in which light deflects at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, in a taking lens system embodying the invention, it is preferable to use lens elements formed out of a uniform material as both of the lens elements L1 and L2 where two lens elements are provided and as all of the lens elements L1 to L3 where three lens elements are provided.

In any of the first to twenty-fifth embodiments, a surface having no optical power (for example, a reflective, refractive, or diffractive surface) may be disposed in the optical path so that the optical path is bent in front of, behind, or in the middle of the taking lens system. Where to bend the optical path may be determined to suit particular needs. By bending the optical path appropriately, it is possible to make the digital input device (such as a digital camera) incorporating the taking lens system apparently slim and compact.

The taking lens systems of the first to twenty-fifth embodiments are all suitable as compact taking lens systems for use in digital input devices, and, by combining one of those taking lens systems with an optical low-pass filter and a solid-state image sensor, it is possible to build a taking lens device that takes in an image of a subject optically and outputs it as an electrical signal. A taking lens device is used as the main component of a camera (for example, a digital camera, video camera, or camera incorporated in or externally fitted to a digital video unit, personal computer, mobile computer, pen-type scanner, cellular phone, personal digital assistant (PDA), or the like) that is used to take a still or moving picture of a subject. A taking lens device is composed of, for example, from the object (subject) side, a taking lens system for forming an optical image of a subject, an optical low-pass filter, and a solid-state image sensor for converting the optical image formed by the taking lens system into an electrical signal.

Thus, the first to twenty-fifth embodiments described hereinbefore include inventions (i) to (xvii) having features as noted below, and, with those features, it is possible to realize high-optical-performance, low-cost, compact taking lens devices. By incorporating such a taking lens device in a digital camera or the like, it is possible to enhance the performance and functionality of the camera, and to reduce the costs and size of the camera.

Covered by the first to ninth embodiments are these inventions:

(i) A taking lens device including a taking lens system for forming an optical image and a solid-state image sensor for converting the optical image formed by the taking lens system into an electrical signal, wherein the taking lens system comprises two lens elements, namely, from an object side, a positive lens element and a meniscus lens element convex to an image side, and at least one of conditions (1) to (5) noted earlier is fulfilled.

(ii) A taking lens device as described in (i) above, further comprising an aperture stop disposed on an object side of the positive lens element.

(iii) A taking lens device as described in (i) or (ii) above, wherein the positive lens element and the meniscus lens element are both plastic lens elements.

(iv) A taking lens device as described in one of (i) to (iii) above, wherein the positive lens element and the meniscus lens element each include at least one aspherical surface.

(v) A taking lens device as described in one of (i) to (iv) above, wherein the positive lens element has a convex surface on an image side thereof.

(vi) A taking lens device as described in one of (i) to (v) above, wherein the positive lens element and the meniscus lens element are both formed out of a uniform material.

Covered by the tenth to twenty-first embodiments are these inventions:

(vii) A taking lens device including a taking lens system for forming an optical image and a solid-state image sensor for converting the optical image formed by the taking lens system into an electrical signal, wherein the taking lens system comprises three lens elements, namely, from an object side, a first lens element having a positive or negative optical power, a second lens element having a positive optical power, and a third lens element having a negative optical power, and at least one of conditions (A0), (A1), (A2), (A2a), (A2b), (A3), and (A3a) noted earlier is fulfilled.

(viii) A taking lens device including a taking lens system for forming an optical image and a solid-state image sensor for converting the optical image formed by the taking lens system into an electrical signal, wherein the taking lens system comprises three lens elements, namely, from an object side, a first lens element having a positive optical power, a second lens element having a positive optical power, and a third lens element having a positive optical power, and at least one of conditions (B1), (B2), and (B3) noted earlier is fulfilled.

(ix) A taking lens device as described in (vii) or (viii) above, further comprising an aperture stop disposed between the first and second lens elements.

(x) A taking lens device as described in one of (vii) to (ix) above, wherein the first to third lens elements are all plastic lens elements.

(xi) A taking lens device as described in one of (vii) to (x) above, wherein the first to third lens elements each include at least one aspherical surface.

(xii) A taking lens device as described in one of (vii) to (xi) above, wherein the first to third lens elements are all formed out of a uniform material.

Covered by the twenty-second to twenty-fifth embodiments are these inventions:

(xiii) A taking lens device including a taking lens system for forming an optical image and a solid-state image sensor for converting the optical image formed by the taking lens system into an electrical signal, wherein the taking lens system comprises two lens elements, namely, from an object side, a first lens element having a meniscus shape with a convex surface on an object side and having a positive optical power and a second lens element having a meniscus shape with a concave surface on an image side, and at least one of conditions (I) to (V) noted earlier is fulfilled.

(xiv) A taking lens device as described in (xiii) above, further comprising an aperture stop disposed on an object side of the first lens element.

(xv) A taking lens device as described in (xiii) or (xiv) above, wherein the first and second lens elements each include at least one aspherical surface.

(xvi) A taking lens device as described in one of (xiii) to (xv) above, wherein the first and second lens elements are both plastic lens elements (xvii) A taking lens device as described in one of (xiii) to (xvi) above, wherein the first and second lens elements are both formed out of a uniform material.

Used as the solid-state image sensor is a CCD, CMOS (complementary metal oxide semiconductor) sensor, or the like having, for example, a plurality of pixels. The optical image formed by the taking lens system is converted into an electrical signal by the solid-state image sensor. The optical image to be formed by the taking lens system passes through the optical low-pass filter having a predetermined cutoff frequency characteristic that depends on the pixel pitch of the solid-state image sensor, and meanwhile the optical image has its spatial frequency characteristic so adjusted as to minimize so-called aliasing noise generated when the optical image is converted into an electric signal. The signal produced by the solid-state image sensor is subjected to predetermined digital image processing, image compression processing, and the like as required, and is recorded in a memory (such as a semiconductor memory or an optical disk) as a digital video signal; in some cases, the signal is transferred to another device through a cable or after being converted into an infrared signal.

In the first to twenty-fifth embodiments, a glass filter GF is used as the optical low-pass filter disposed between the last surface of the taking lens system and the solid-state image sensor. It is possible, however, to use instead an optical low-pass filter of any other type that suits the digital input device in which the taking lens system is incorporated. For example, it is possible to use a birefringence-type low-pass filter made of quartz or the like having an appropriately aligned crystal axis, a phase-type low-pass filter that achieves the required optical cut-off frequency characteristics by exploiting diffraction, or a low-pass filter of any other type.

EXAMPLES

Hereinafter, practical examples of the present invention will be presented with reference to their construction data and other data. Tables 1 to 25 show the construction data of Examples 1 to 25, respectively. Examples 1 to 25 correspond to the first to twenty-fifth embodiments described hereinabove. Thus, the lens construction diagrams (FIGS. 1 to 5, FIGS. 11 to 14, FIGS. 19 to 30, and FIGS. 43 to 46) of the first to twenty-fifth embodiments also show the lens constructions of Examples 1 to 25, respectively. In the construction data of each example, ri (i=1, 2, 3, . . . ) represents the radius of curvature (mm) of the i-th surface from the object side, di (i=1, 2, 3, . . . ) represents the i-th axial distance (mm) from the object side, and Ni (i=1, 2, 3, . . . ) and vi (i=1, 2, 3, . . . ) respectively represent the refractive index (Nd) for the d-line and the Abbe number (vd) of the i-th optical element from the object side. Shown together with these data are the focal length (f, mm) of the taking lens system as a whole and the f-number (FNO). Table 26 shows the values of the conditional formulae as actually observed in Examples 1 to 9, Table 27 shows the values of the conditional formulae as actually observed in Examples 10 to 21, and Table 28 shows the values of the conditional formulae as actually observed in Examples 22 to 25.

A surface of which the radius of curvature ri is marked with an asterisk (*) is a refractive optical surface having an aspherical shape or a surface that exerts a refractive effect equivalent to that of an aspherical surface. The surface shape of such an aspherical surface is defined by formula (AS) below. The aspherical surface data of the aspherical surfaces used in each example are also shown together with the other data mentioned above.

$$X(H) = (C0 \cdot H^2)/(1+\sqrt{1-\epsilon \cdot C0^2 \cdot H^2}) + \Sigma(Ai \cdot H^i) \quad (AS)$$

where

X(H) represents the displacement along the optical axis AX at the height H (relative to the vertex);

H represents the height in a direction perpendicular to the optical axis AX;

C0 represents the paraxial curvature (=the reciprocal of the radius of curvature);

$\epsilon$ represents the quadric surface parameter; and

Ai represents the aspherical surface coefficient of i-th order (the data are omitted if Ai=0).

Figure 6A:
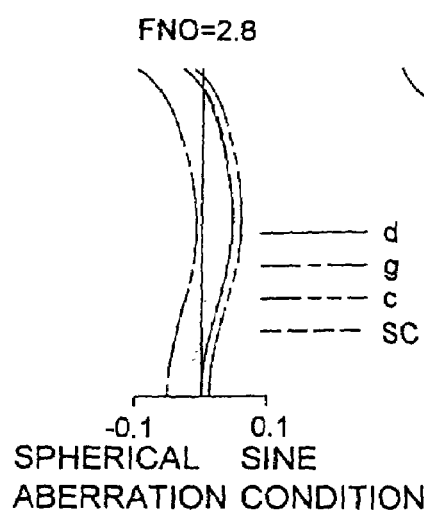
FIGS. 6A to 6C are aberration diagrams of Example 1.
Figure 6B:
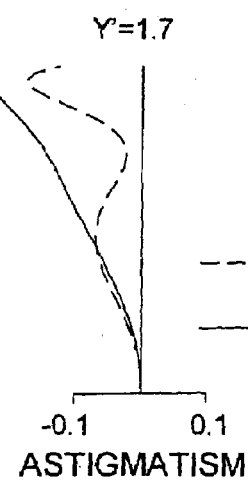
Figure 6C:
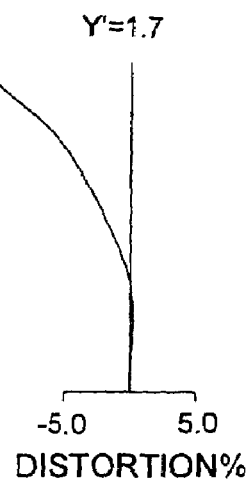
Figure 17A:
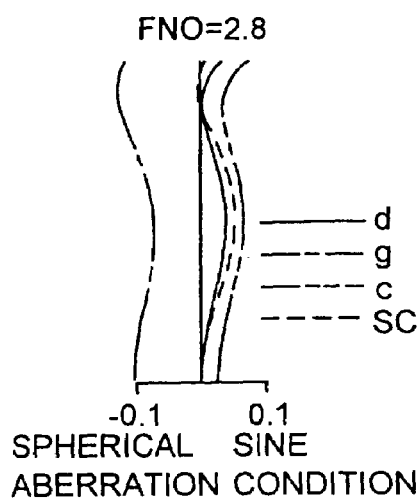
FIGS. 17A to 17C are aberration diagrams of Example 8.
Figure 17B:
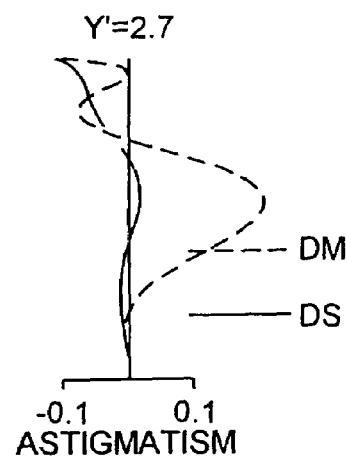
Figure 17C:
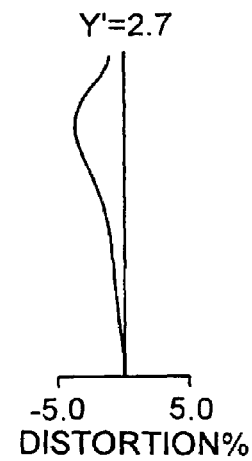
Figure 18A:
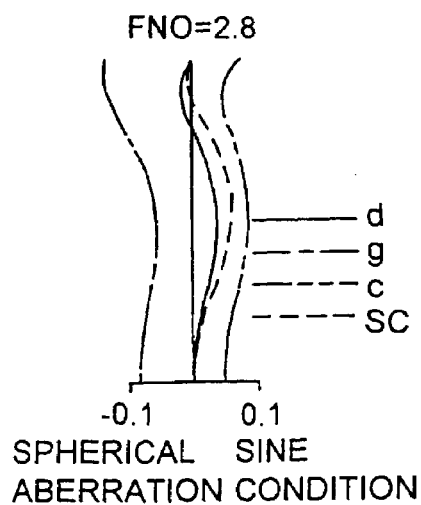
FIGS. 18A to 18C are aberration diagrams of Example 9.
Figure 18B:
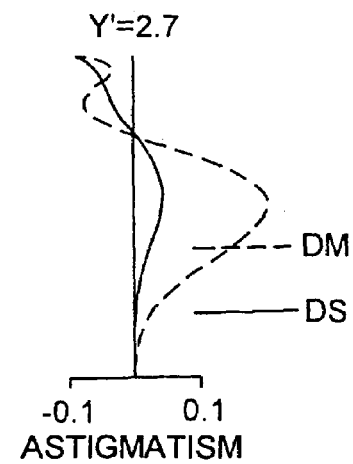
Figure 18C:
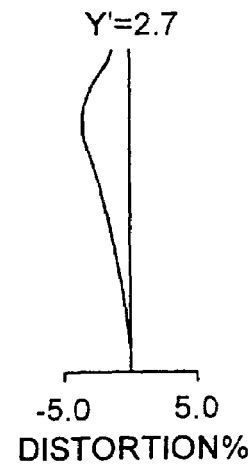
Figure 37A:
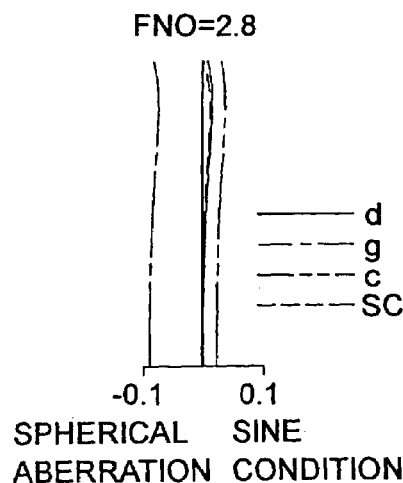
FIGS. 37A to 37C are aberration diagrams of Example 16.
Figure 37B:
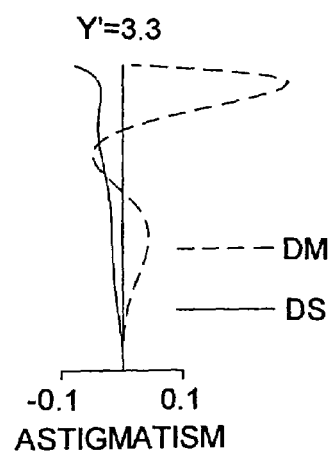
Figure 37C:
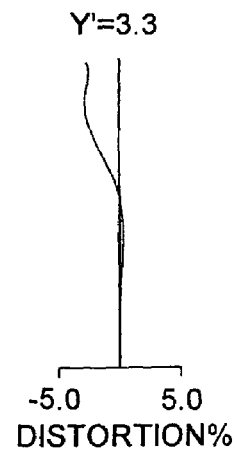
Figure 38A:
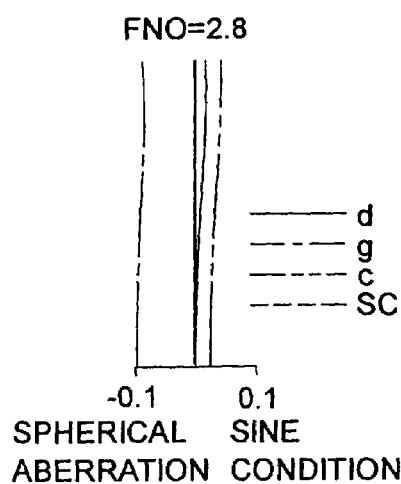
FIGS. 38A to 38C are aberration diagrams of Example 17.
Figure 38B:
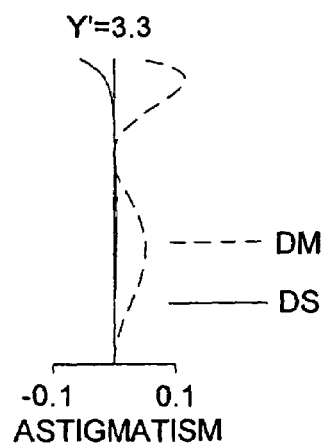
Figure 38C:
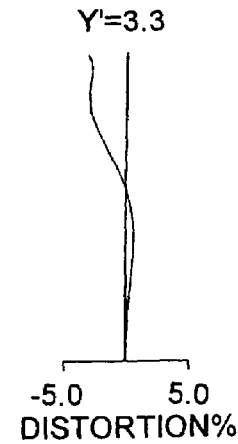
Figure 41A:
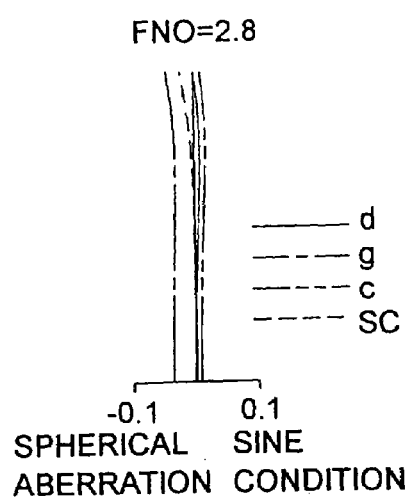
FIGS. 41A to 41C are aberration diagrams of Example 20.
Figure 41B:
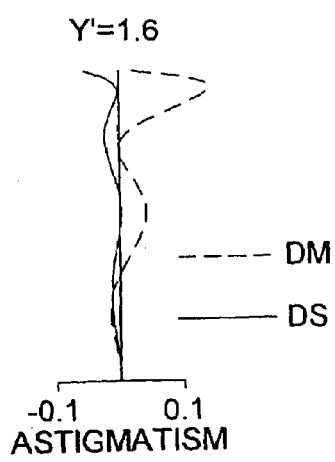
Figure 41C:
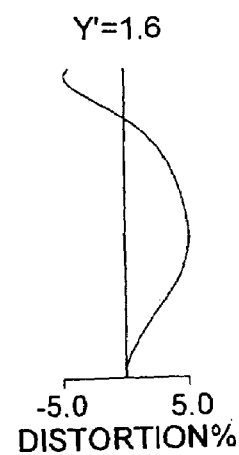
Figure 42A:
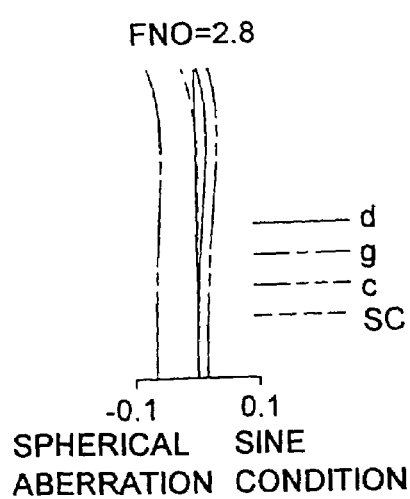
FIGS. 42A to 42C are aberration diagrams of Example 21.
Figure 42B:
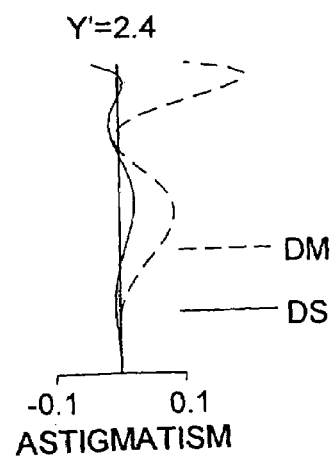
Figure 42C:
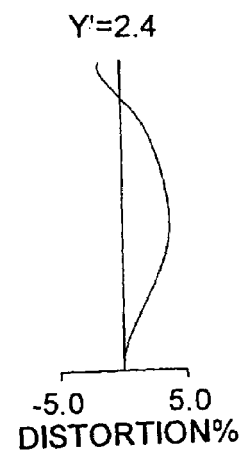

FIGS. 6A to 6C, FIGS. 7A to 7C, FIGS. 8A to 8C, FIGS. 9A to 9C, FIGS. 10A to 10C, FIGS. 15A to 15C, FIGS. 16A to 16C, FIGS. 17A to 17C, FIGS. 18A to 18C, FIGS. 31A to 31C, FIGS. 32A to 32C, FIGS. 33A to 33C, FIGS. 34A to 34C, FIGS. 35A to 35C, FIGS. 36A to 36C, FIGS. 37A to 37C, FIGS. 38A to 38C, FIGS. 39A to 39C, FIGS. 40A to 40C, FIGS. 41A to 41C, FIGS. 42A to 42C, FIGS. 47A to 47C, FIGS. 48A to 48C, FIGS. 49A to 49C, and FIGS. 50A to 50C are aberration diagrams of Examples 1 to 25, respectively. Of these aberration diagrams, those suffixed with "A" show aspherical aberration, those suffixed with "B" show astigmatism, and those suffixed with "C" show distortion, with FNO representing the f-number and Y' representing the maximum image height (mm). In the aspherical aberration diagrams, the solid line (d), dash-and-dot line (g), and dash-dot-dot line (c) represent the spherical aberration (mm) observed for the d-, g-, and c-lines, respectively, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, it is possible to realize a high-optical-performance, low-cost, compact taking lens system for use with a solid-state image sensor. By incorporating a taking lens system according to the invention in a digital input device such as a digital camera, it is possible to enhance the performance and functionality of the camera, and to reduce the costs and size of the camera.

TABLE 1

Example 1
f = 2.119, FNO = 2.8

| Radius of Curvature | Axial Distance | Refractive Index | Abbe Number |
|---|---|---|---|
| r1 = ∞ (ST) | d1 = 0.100 | | |
| r2* = 14.004 | d2 = 0.934 | N1 = 1.53048 | ν1 = 55.72 (L1) |
| r3* = −0.748 | d3 = 0.356 | | |
| r4* = −0.505 | d4 = 0.700 | N2 = 1.53048 | ν2 = 55.72 (L2) |
| r5* = −0.780 | d5 = 0.550 | | |
| r6 = ∞ | d6 = 0.300 | N3 = 1.55671 | ν3 = 58.56 (GF) |
| r7 = ∞ | | | |

Aspherical Surface Data of Surface r2
$\epsilon = 0.10000 \times 10$, A4 = −0.60922, A6 = 0.42585 × 10, A8 = −0.27080 × $10^2$, A10 = 0.57074 × $10^2$
Aspherical Surface Data of Surface r3
$\epsilon = 0.10000 \times 10$, A4 = 0.20595, A6 = 0.66693, A8 = −0.35879 × 10, A10 = 0.70076 × 10
Aspherical Surface Data of Surface r4
$\epsilon = 0.41661$, A4 = 0.69389, A6 = −0.73826, A8 = 0.49177, A10 = 0.40650 × 10
Aspherical Surface Data of Surface r5
$\epsilon = 0.34473$, A4 = 0.18737, A6 = −0.13504, A8 = 0.10386, A10 = 0.47421 × $10^{-1}$

TABLE 2

Example 2
f = 2.180, FNO = 2.8

| Radius of Curvature | Axial Distance | Refractive Index | Abbe Number |
|---|---|---|---|
| r1 = ∞ (ST) | d1 = 0.100 | | |
| r2* = 9.321 | d2 = 0.980 | N1 = 1.53048 | ν1 = 55.72 (L1) |
| r3* = −0.765 | d3 = 0.460 | | |
| r4* = −0.520 | d4 = 0.700 | N2 = 1.53048 | ν2 = 55.72 (L2) |
| r5* = −0.835 | d5 = 0.300 | | |
| r6 = ∞ | d6 = 0.300 | N3 = 1.55671 | ν3 = 58.56 (GF) |
| r7 = ∞ | | | |

Aspherical Surface Data of Surface r2
$\epsilon = 0.10000 \times 10$, A4 = −0.77522, A6 = 0.53726 × 10, A8 = −0.32765 × $10^2$, A10 = 0.59362 × $10^2$
Aspherical Surface Data of Surface r3
$\epsilon = 0.10000 \times 10$, A4 = 0.47434 × $10^{-1}$, A6 = 0.92517, A8 = −0.39915 × 10, A10 = 0.61773 × 10
Aspherical Surface Data of Surface r4
$\epsilon = 0.45309$, A4 = 0.45100, A6 = −0.12922 × 10, A8 = −0.26299 × $10^{-2}$, A10 = 0.63532 × 10
Aspherical Surface Data of Surface r5
$\epsilon = 0.30958$, A4 = 0.12155, A6 = −0.25827, A8 = 0.96502 × $10^{-1}$, A10 = 0.93491 × $10^{-1}$

TABLE 3

Example 3
f = 2.392, FNO = 2.8

| Radius of Curvature | Axial Distance | Refractive Index | Abbe Number |
|---|---|---|---|
| r1 = ∞ (ST) | d1 = 0.100 | | |
| r2* = 12.619 | d2 = 0.995 | N1 = 1.49300 | ν1 = 58.34 (L1) |
| r3* = −0.789 | d3 = 0.555 | | |
| r4* = −0.539 | d4 = 0.700 | N2 = 1.49300 | ν2 = 58.34 (L2) |
| r5* = −0.851 | d5 = 0.600 | | |
| r6 = ∞ | d6 = 0.300 | N3 = 1.55671 | ν3 = 58.56 (GF) |
| r7 = ∞ | | | |

Aspherical Surface Data of Surface r2
$\epsilon = 0.10000 \times 10$, A4 = −0.49071, A6 = 0.17079 × 10, A8 = −0.10734 × $10^2$, A10 = 0.13673 × $10^2$
Aspherical Surface Data of Surface r3
$\epsilon = 0.10000 \times 10$, A4 = 0.82742 × $10^{-1}$, A6 = 0.58829, A8 = −0.25085 × 10, A10 = 0.35644 × 10
Aspherical Surface Data of Surface r4
$\epsilon = 0.41561$, A4 = 0.45783, A6 = −0.51568, A8 = −0.72834, A10 = 0.31515 × 10
Aspherical Surface Data of Surface r5
$\epsilon = 0.92694 \times 10^{-1}$, A4 = 0.15747, A6 = −0.21926, A8 = 0.95908 × $10^{-1}$, A10 = 0.32892 × $10^{-1}$

TABLE 4

Example 4
f = 2.374, FNO = 2.8

| Radius of Curvature | Axial Distance | Refractive Index | Abbe Number |
|---|---|---|---|
| r1 = ∞ (ST) | d1 = 0.100 | | |
| r2* = −5.278 | d2 = 0.962 | N1 = 1.49300 | ν1 = 58.34 (L1) |
| r3* = −0.786 | d3 = 0.913 | | |
| r4* = −0.591 | d4 = 0.778 | N2 = 1.49300 | ν2 = 58.34 (L2) |
| r5* = −0.783 | d5 = 0.347 | | |
| r6 = ∞ | d6 = 0.300 | N3 = 1.55671 | ν3 = 58.56 (GF) |
| r7 = ∞ | | | |

Aspherical Surface Data of Surface r2
$\epsilon = 0.10000 \times 10$, A4 = −0.68130, A6 = 0.30939 × 10, A8 = −0.18095 × $10^2$, A10 = 0.27086 × $10^2$
Aspherical Surface Data of Surface r3
$\epsilon = 0.10000 \times 10$, A4 = −0.86141 × $10^{-3}$, A6 = 0.12975 × 10, A8 = −0.39114 × 10, A10 = 0.46366 × 10
Aspherical Surface Data of Surface r4
$\epsilon = 0.19656$, A4 = 0.20973, A6 = 0.88754, A8 = −0.19835 × 10, A10 = 0.12315 × 10
Aspherical Surface Data of Surface r5
$\epsilon = 0.14590 \times 10^{-1}$, A4 = 0.46878 × $10^{-1}$, A6 = 0.28832, A8 = −0.33358, A10 = 0.10235

TABLE 5

Example 5
f = 2.375, FNO = 2.8

| Radius of Curvature | Axial Distance | Refractive Index | Abbe Number |
|---|---|---|---|
| r1 = ∞ (ST) | d1 = 0.100 | | |
| r2* = −6.289 | d2 = 1.023 | N1 = 1.49300 | ν1 = 58.34 (L1) |
| r3* = −0.787 | d3 = 0.901 | | |
| r4* = −0.579 | d4 = 0.757 | N2 = 1.49300 | ν2 = 58.34 (L2) |
| r5* = −0.787 | d5 = 0.319 | | |

TABLE 5-continued

Example 5
f = 2.375, FNO = 2.8

| Radius of Curvature | Axial Distance | Refractive Index | Abbe Number |
|---|---|---|---|
| r6 = ∞ | d6 = 0.300 | N3 = 1.55671 | ν3 = 58.56 (GF) |
| r7 = ∞ | | | |

Aspherical Surface Data of Surface r2
$\epsilon = 0.10000 \times 10$, $A4 = -0.61574$, $A6 = 0.27047 \times 10$, $A8 = -0.14574 \times 10^2$, $A10 = 0.20838 \times 10^2$ Aspherical Surface Data of Surface r3
$\epsilon = 0.10000 \times 10$, $A4 = 0.33612 \times 10^{-1}$, $A6 = 0.13141 \times 10$, $A8 = -0.38282 \times 10$, $A10 = 0.46049 \times 10$ Aspherical Surface Data of Surface r4
$\epsilon = 0.25079$, $A4 = 0.43435$, $A6 = 0.35935$, $A8 = -0.10230 \times 10$, $A10 = 0.69428$ Aspherical Surface Data of Surface r5
$\epsilon = 0.15308$, $A4 = 0.16833$, $A6 = 0.10306$, $A8 = -0.16605$, $A10 = 0.53841 \times 10^{-1}$

TABLE 6

Example 6
f = 2.804, FNO = 2.4

| Radius of Curvature | Axial Distance | Refractive Index | Abbe Number |
|---|---|---|---|
| r1 = ∞ (ST) | d1 = 0.100 | | |
| r2* = 10.855 | d2 = 1.481 | N1 = 1.53048 | ν1 = 55.72 (L1) |
| r3* = −1.144 | d3 = 1.053 | | |
| r4* = −0.581 | d4 = 0.829 | N2 = 1.53048 | ν2 = 55.72 (L2) |
| r5* = −0.775 | d5 = 0.300 | | |
| r6 = ∞ | d6 = 0.500 | N3 = 1.55671 | ν3 = 58.56 (GF) |
| r7 = ∞ | | | |

Aspherical Surface Data of Surface r2
$\epsilon = 0.10000 \times 10$, $A4 = -0.15651$, $A6 = 0.11167$, $A8 = -0.32391$, $A10 = 0.34248 \times 10^{-1}$ Aspherical Surface Data of Surface r3
$\epsilon = 0.10000 \times 10$, $A4 = 0.41892 \times 10^{-1}$, $A6 = 0.76547 \times 10^{-1}$, $A8 = -0.14162$, $A10 = 0.10402$ Aspherical Surface Data of Surface r4
$\epsilon = 0.19958$, $A4 = 0.28237$, $A6 = 0.17718$, $A8 = -0.16551$, $A10 = 0.89150 \times 10^{-1}$ Aspherical Surface Data of Surface r5
$\epsilon = 0.24463$, $A4 = 0.18871$, $A6 = 0.67706 \times 10^{-1}$, $A8 = -0.42828 \times 10^{-1}$, $A10 = 0.14796 \times 10^{-1}$

TABLE 7

Example 7
f = 2.746, FNO = 2.8

| Radius of Curvature | Axial Distance | Refractive Index | Abbe Number |
|---|---|---|---|
| r1 = ∞ (ST) | d1 = 0.100 | | |
| r2* = −30.298 | d2 = 1.334 | N1 = 1.53048 | ν1 = 55.72 (L1) |
| r3* = −1.098 | d3 = 1.248 | | |
| r4* = −0.574 | d4 = 0.592 | N2 = 1.53048 | ν2 = 55.72 (L2) |
| r5* = −0.736 | d5 = 0.300 | | |

TABLE 7-continued

Example 7
f = 2.746, FNO = 2.8

| Radius of Curvature | Axial Distance | Refractive Index | Abbe Number |
|---|---|---|---|
| r6 = ∞ | d6 = 0.500 | N3 = 1.55671 | ν3 = 58.56 (GF) |
| r7 = ∞ | | | |

Aspherical Surface Data of Surface r2
$\epsilon = 0.10000 \times 10$, $A4 = -0.20083$, $A6 = 0.26357$, $A8 = -0.12016 \times 10$, $A10 = 0.10652 \times 10$ Aspherical Surface Data of Surface r3
$\epsilon = 0.10000 \times 10$, $A4 = 0.40952 \times 10^{-1}$, $A6 = 0.48180 \times 10^{-1}$, $A8 = -0.10285$, $A10 = 0.94572 \times 10^{-1}$ Aspherical Surface Data of Surface r4
$\epsilon = 0.23362$, $A4 = 0.42418$, $A6 = 0.93561 \times 10^{-1}$, $A8 = -0.18280$, $A10 = 0.14827$ Aspherical Surface Data of Surface r5
$\epsilon = 0.26069$, $A4 = 0.29294$, $A6 = 0.29030 \times 10^{-1}$, $A8 = -0.55942 \times 10^{-1}$, $A10 = 0.28511 \times 10^{-1}$

TABLE 8

Example 8
f = 4.302, FNO = 2.8

| Radius of Curvature | Axial Distance | Refractive Index | Abbe Number |
|---|---|---|---|
| r1 = ∞ (ST) | d1 = 0.200 | | |
| r2* = 5.093 | d2 = 1.567 | N1 = 1.53048 | ν1 = 55.72 (L1) |
| r3* = −2.006 | d3 = 1.436 | | |
| r4* = −1.882 | d4 = 0.605 | N2 = 1.53048 | ν2 = 55.72 (L2) |
| r5* = −27.566 | d5 = 0.300 | | |
| r6 = ∞ | d6 = 0.500 | N3 = 1.55671 | ν3 = 58.56 (GF) |
| r7 = ∞ | | | |

Aspherical Surface Data of Surface r2
$\epsilon = 0.10000 \times 10$, $A4 = -0.49610 \times 10^{-1}$, $A6 = -0.60887 \times 10^{-2}$, $A8 = -0.19423 \times 10^{-1}$, $A10 = -0.43911 \times 10^{-1}$ Aspherical Surface Data of Surface r3
$\epsilon = 0.10000 \times 10$, $A4 = -0.85382 \times 10^{-2}$, $A6 = -0.58224 \times 10^{-1}$, $A8 = 0.35121 \times 10^{-1}$, $A10 = -0.12013 \times 10^{-1}$ Aspherical Surface Data of Surface r4
$\epsilon = 0.18324 \times 10$, $A4 = -0.56851 \times 10^{-1}$, $A6 = -0.24185$, $A8 = 0.11681$, $A10 = 0.58867 \times 10^{-2}$ Aspherical Surface Data of Surface r5
$\epsilon = 0.10686 \times 10^3$, $A4 = -0.67211 \times 10^{-1}$, $A6 = -0.35152 \times 10^{-1}$, $A8 = 0.21419 \times 10^{-1}$, $A10 = -0.23739 \times 10^{-2}$

TABLE 9

Example 9
f = 4.274, FNO = 2.8

| Radius of Curvature | Axial Distance | Refractive Index | Abbe Number |
|---|---|---|---|
| r1 = ∞ (ST) | d1 = 0.200 | | |
| r2* = 5.395 | d2 = 1.606 | N1 = 1.53275 | ν1 = 55.72 (L1) |
| r3* = −1.857 | d3 = 1.397 | | |
| r4* = −1.568 | d4 = 0.605 | N2 = 1.53275 | ν2 = 55.72 (L2) |
| r5* = −12.154 | d5 = 0.300 | | |

TABLE 9-continued

Example 9
f = 4.274, FNO = 2.8

| Radius of Curvature | Axial Distance | Refractive Index | Abbe Number |
|---|---|---|---|
| r6 = ∞ | d6 = 0.500 | N3 = 1.55898 | ν3 = 58.56 (GF) |
| r7 = ∞ | | | |

Aspherical Surface Data of Surface r2
$\epsilon = 0.10000 \times 10$, A4 = $-0.51641 \times 10^{-1}$, A6 = $-0.13979 \times 10^{-1}$, A8 = $-0.43725 \times 10^{-2}$, A10 = $-0.61434 \times 10^{-1}$
Aspherical Surface Data of Surface r3
$\epsilon = 0.10000 \times 10$, A4 = $-0.42042 \times 10^{-2}$, A6 = $-0.58122 \times 10^{-1}$, A8 = $0.37522 \times 10^{-1}$, A10 = $-0.12698 \times 10^{-1}$
Aspherical Surface Data of Surface r4
$\epsilon = 0.11558 \times 10$, A4 = $-0.10226$, A6 = $-0.19605$, A8 = $0.15709$, A10 = $-0.19263 \times 10^{-1}$
Aspherical Surface Data of Surface r5
$\epsilon = 0.14231 \times 10^2$, A4 = $-0.90442 \times 10^{-1}$, A6 = $-0.45273 \times 10^{-2}$, A8 = $0.13523 \times 10^{-1}$, A10 = $-0.18311 \times 10^{-2}$

TABLE 10

Example 10
f = 3.469, FNO = 2.8

| Radius of Curvature | Axial Distance | Refractive Index | Abbe Number |
|---|---|---|---|
| r1* = 2.800 | d1 = 1.322 | N1 = 1.58340 | ν1 = 30.23 (L1) |
| r2* = 1.595 | d2 = 0.741 | | |
| r3 = ∞ (ST) | d3 = 0.442 | | |
| r4* = 5.686 | d4 = 1.686 | N2 = 1.53048 | ν2 = 55.72 (L2) |
| r5* = −1.141 | d5 = 0.100 | | |
| r6* = 18.824 | d6 = 1.026 | N3 = 1.58340 | ν3 = 30.23 (L3) |
| r7* = 2.039 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.32631$, A4 = $0.23941 \times 10^{-1}$, A6 = $-0.24142 \times 10^{-3}$, A8 = $0.87227 \times 10^{-3}$
Aspherical Surface Data of Surface r2
$\epsilon = 0.20000 \times 10$, A4 = $0.83403 \times 10^{-1}$, A6 = $0.98460 \times 10^{-3}$, A8 = $0.49924 \times 10^{-1}$
Aspherical Surface Data of Surface r4
$\epsilon = 0.18973 \times 10$, A4 = $-0.11614 \times 10^{-1}$, A6 = $-0.22756 \times 10^{-1}$, A8 = $0.82323 \times 10^{-2}$
Aspherical Surface Data of Surface r5
$\epsilon = 0.26870$, A4 = $0.34068 \times 10^{-1}$, A6 = $-0.14733 \times 10^{-1}$, A8 = $0.56763 \times 10^{-3}$
Aspherical Surface Data of Surface r6
$\epsilon = 0.0$ A4 = $-0.47058 \times 10^{-1}$, A6 = $-0.90811 \times 10^{-2}$, A8 = $0.19180 \times 10^{-2}$
Aspherical Surface Data of Surface r7
$\epsilon = 0.35130$, A4 = $-0.86078 \times 10^{-1}$, A6 = $0.14913 \times 10^{-1}$, A8 = $-0.18277 \times 10^{-2}$

TABLE 11

Example 11
f = 3.467, FNO = 2.8

| Radius of Curvature | Axial Distance | Refractive Index | Abbe Number |
|---|---|---|---|
| r1* = 3.914 | d1 = 1.633 | N1 = 1.58340 | ν1 = 30.23 (L1) |
| r2* = 2.253 | d2 = 0.545 | | |
| r3 = ∞ (ST) | d3 = 0.300 | | |
| r4* = 5.484 | d4 = 2.097 | N2 = 1.53048 | ν2 = 55.72 (L2) |
| r5* = −0.992 | d5 = 0.100 | | |
| r6* = 6.928 | d6 = 0.700 | N3 = 1.58340 | ν3 = 30.23 (L3) |
| r7* = 1.261 | d7 = 1.000 | | |

TABLE 11-continued

Example 11
f = 3.467, FNO = 2.8

| Radius of Curvature | Axial Distance | Refractive Index | Abbe Number |
|---|---|---|---|
| r8 = ∞ | d8 = 0.500 | N4 = 1.51680 | ν4 = 64.20 (GF) |
| r9 = ∞ | | | |

Aspherical Surface Data of Surface r1
$\epsilon = 0.10000 \times 10$, A4 = $0.15050 \times 10^{-1}$, A6 = $0.17624 \times 10^{-2}$, A8 = $-0.28942 \times 10^{-3}$, A10 = $0.15435 \times 10^{-3}$
Aspherical Surface Data of Surface r2
$\epsilon = 0.10000 \times 10$, A4 = $0.12063$, A6 = $0.53318 \times 10^{-1}$, A8 = $-0.34519 \times 10^{-1}$, A10 = $0.15360$
Aspherical Surface Data of Surface r4
$\epsilon = 0.10000 \times 10$, A4 = $0.21812 \times 10^{-1}$, A6 = $0.13669 \times 10^{-1}$, A8 = $0.89058 \times 10^{-2}$, A13 = $-0.10085 \times 10^{-1}$
Aspherical Surface Data of Surface r5
$\epsilon = 0.10969$, A4 = $0.13179$, A6 = $-0.87983 \times 10^{-1}$, A8 = $0.39597 \times 10^{-1}$, A10 = $-0.51378 \times 10^{-2}$
Aspherical Surface Data of Surface r6
$\epsilon = 0.10000 \times 10$, A4 = $-0.98804 \times 10^{-1}$, A6 = $0.25381 \times 10^{-1}$, A8 = $-0.41254 \times 10^{-2}$, A10 = $-0.74291 \times 10^{-3}$
Aspherical Surface Data of Surface r7
$\epsilon = -0.50000 \times 10$, A4 = $-0.69548 \times 10^{-1}$, A6 = $0.27279 \times 10^{-1}$, A8 = $-0.76305 \times 10^{-2}$, A10 = $0.73965 \times 10^{-3}$

TABLE 12

Example 12
f = 3.965, FNO = 2.8

| Radius of Curvature | Axial Distance | Refractive Index | Abbe Number |
|---|---|---|---|
| r1* = 5.638 | d1 = 1.569 | N1 = 1.58340 | ν1 = 30.23 (L1) |
| r2* = 3.303 | d2 = 0.394 | | |
| r3 = ∞ (ST) | d3 = 0.200 | | |
| r4* = 4.256 | d4 = 2.649 | N2 = 1.53048 | ν2 = 55.72 (L2) |
| r5* = −1.065 | d5 = 0.100 | | |
| r6* = 19.154 | d6 = 0.799 | N3 = 1.58340 | ν3 = 30.23 (L3) |
| r7* = 1.266 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.10000 \times 10$, A4 = $0.12129 \times 10^{-1}$, A6 = $0.31044 \times 10^{-2}$, A8 = $-0.11652 \times 10^{-2}$, A10 = $0.19214 \times 10^{-3}$
Aspherical Surface Data of Surface r2
$\epsilon = 0.10000 \times 10$, A4 = $0.10276$, A6 = $0.19545 \times 10^{-1}$, A8 = $-0.73712 \times 10^{-2}$, A10 = $0.55142 \times 10^{-1}$
Aspherical Surface Data of Surface r4
$\epsilon = 0.10000 \times 10$, A4 = $0.45950 \times 10^{-1}$, A6 = $0.47759 \times 10^{-2}$, A8 = $0.79466 \times 10^{-2}$, A10 = $-0.12984 \times 10^{-1}$
Aspherical Surface Data of Surface r5
$\epsilon = 0.11091$, A4 = $0.12806$, A6 = $-0.70237 \times 10^{-1}$, A8 = $0.26286 \times 10^{-1}$, A10 = $-0.27364 \times 10^{-2}$
Aspherical Surface Data of Surface r6
$\epsilon = 0.10000 \times 10$, A4 = $-0.85336 \times 10^{-1}$, A6 = $0.25832 \times 10^{-1}$, A8 = $-0.89579 \times 10^{-2}$, A10 = $0.67422 \times 10^{-3}$
Aspherical Surface Data of Surface r7
$\epsilon = -0.50000 \times 10$, A4 = $-0.52773 \times 10^{-1}$, A6 = $0.17861 \times 10^{-1}$, A8 = $-0.46675 \times 10^{-2}$, A10 = $0.43220 \times 10^{-3}$

TABLE 13

Example 13
f = 3.507, FNO = 2.8

| Radius of Curvature | Axial Distance | Refractive Index | Abbe Number |
|---|---|---|---|
| r1* = 68.391 | d1 = 0.872 | N1 = 1.53048 | ν1 = 55.72 (L1) |
| r2* = −6.304 | d2 = 0.938 | | |
| r3 = ∞ (ST) | d3 = 0.500 | | |
| r4* = −3.703 | d4 = 1.649 | N2 = 1.53048 | ν2 = 55.72 (L2) |
| r5* = −0.852 | d5 = 0.100 | | |

TABLE 13-continued

Example 13
$f = 3.507, FNO = 2.8$

| Radius of Curvature | Axial Distance | Refractive Index | Abbe Number |
|---|---|---|---|
| r6* = 11.946 | d6 = 0.700 | N3 = 1.58340 | ν3 = 30.23 (L3) |
| r7* = 1.225 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.51000 \times 10^2, A4 = 0.56767 \times 10^{-2}, A6 = 0.35339 \times 10^{-2}, A8 = -0.16790 \times 10^{-2}, A10 = 0.18541 \times 10^{-3}$
Aspherical Surface Data of Surface r2
$\epsilon = 0.15652 \times 10^2, A4 = 0.29585 \times 10^{-1}, A6 = 0.49258 \times 10^{-2}, A8 = -0.68370 \times 10^{-2}, A10 = 0.21683 \times 10^{-2}$
Aspherical Surface Data of Surface r4
$\epsilon = 0.14877 \times 10, A4 = -0.79140 \times 10^{-1}, A6 = -0.47628 \times 10^{-1}, A8 = 0.48397 \times 10^{-1}, A10 = -0.11082$
Aspherical Surface Data of Surface r5
$\epsilon = -0.10000 \times 10, A4 = -0.10074 \times 10^{-1}, A6 = -0.10146, A8 = 0.69391 \times 10^{-1}, A10 = -0.22979 \times 10^{-1}$
Aspherical Surface Data of Surface r6
$\epsilon = 0.21028 \times 10, A4 = -0.38111 \times 10^{-1}, A6 = 0.40875 \times 10^{-2}, A8 = 0.27790 \times 10^{-2}, A10 = -0.24091 \times 10^{-2}$
Aspherical Surface Data of Surface r7
$\epsilon = -0.60000 \times 10, A4 = -0.45478 \times 10^{-1}, A6 = 0.20696 \times 10^{-1}, A8 = -0.67145 \times 10^{-2}, A10 = 0.63538 \times 10^{-3}$

TABLE 14

Example 14
$f = 4.046, FNO = 2.8$

| Radius of Curvature | Axial Distance | Refractive Index | Abbe Number |
|---|---|---|---|
| r1* = 5.219 | d1 = 1.013 | N1 = 1.53048 | ν1 = 55.72 (L1) |
| r2* = −64.896 | d2 = 0.748 | | |
| r3 = ∞ (ST) | d3 = 0.500 | | |
| r4* = −4.392 | d4 = 1.756 | N2 = 1.53048 | ν2 = 55.72 (L2) |
| r5* = −0.904 | d5 = 0.100 | | |
| r6* = 20.088 | d6 = 0.725 | N3 = 1.58340 | ν3 = 30.23 (L3) |
| r7* = 1.208 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = -0.70781 \times 10, A4 = 0.89349 \times 10^{-2}, A6 = 0.47221 \times 10^{-2}, A8 = -0.10936 \times 10^{-2}, A10 = 0.26309 \times 10^{-3}$
Aspherical Surface Data of Surface r2
$\epsilon = -0.14000 \times 10^2, A4 = 0.21091 \times 10^{-1}, A6 = 0.65881 \times 10^{-2}, A8 = -0.31253 \times 10^{-2}, A10 = 0.14822 \times 10^{-2}$
Aspherical Surface Data of Surface r4
$\epsilon = 0.21386 \times 10, A4 = -0.36204 \times 10^{-1}, A6 = -0.25647 \times 10^{-1}, A8 = 0.63204 \times 10^{-1}, A10 = -0.70302 \times 10^{-1}$
Aspherical Surface Data of Surface r5
$\epsilon = -0.97822, A4 = 0.29364 \times 10^{-1}, A6 = -0.10042, A8 = 0.61685 \times 10^{-1}, A10 = -0.15831 \times 10^{-1}$
Aspherical Surface Data of Surface r6
$\epsilon = -0.20000 \times 10, A4 = -0.46735 \times 10^{-1}, A6 = 0.63444 \times 10^{-2}, A8 = 0.57281 \times 10^{-2}, A10 = -0.26912 \times 10^{-2}$
Aspherical Surface Data of Surface r7
$\epsilon = -0.60000 \times 10, A4 = -0.60010 \times 10^{-1}, A6 = 0.24137 \times 10^{-1}, A8 = -0.56437 \times 10^{-2}, A10 = 0.43112 \times 10^{-3}$

TABLE 15

Example 15
$f = 4.057, FNO = 2.8$

| Radius of Curvature | Axial Distance | Refractive Index | Abbe Number |
|---|---|---|---|
| r1* = 3.887 | d1 = 1.137 | N1 = 1.53048 | ν1 = 55.72 (L1) |
| r2* = 50.974 | d2 = 0.745 | | |
| r3* = ∞ (ST) | d3 = 0.500 | | |

TABLE 15-continued

Example 15
$f = 4.057, FNO = 2.8$

| Radius of Curvature | Axial Distance | Refractive Index | Abbe Number |
|---|---|---|---|
| r4* = −3.040 | d4 = 1.696 | N2 = 1.53048 | ν2 = 55.72 (L2) |
| r5* = −1.374 | d5 = 0.100 | | |
| r6* = 1.971 | d6 = 0.700 | N3 = 1.58340 | ν3 = 30.23 (L3) |
| r7* = 1.157 | d7 = 1.000 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = -0.17782 \times 10, A4 = 0.61057 \times 10^{-2}, A6 = 0.14542 \times 10^{-2}, A8 = -0.49868 \times 10^{-3}, A10 = 0.16539 \times 10^{-3}$
Aspherical Surface Data of Surface r2
$\epsilon = 0.16000 \times 10^2, A4 = 0.61220 \times 10^{-2}, A6 = -0.75168 \times 10^{-3}, A8 = 0.15948 \times 10^{-2}, A10 = -0.17231 \times 10^{-4}$
Aspherical Surface Data of Surface r4
$\epsilon = 0.84433, A4 = 0.61538 \times 10^{-2}, A6 = -0.21453, A8 = 0.30585, A10 = -0.20991$
Aspherical Surface Data of Surface r5
$\epsilon = 0.36507, A4 = -0.44642 \times 10^{-1}, A6 = 0.12082 \times 10^{-1}, A8 = 0.88202 \times 10^{-2}, A10 = -0.56296 \times 10^{-2}$
Aspherical Surface Data of Surface r6
$\epsilon = -0.20000 \times 10, A4 = -0.14745, A6 = 0.32555 \times 10^{-1}, A8 = 0.43398 \times 10^{-2}, A10 = -0.22720 \times 10^{-2}$
Aspherical Surface Data of Surface r7
$\epsilon = -0.19045 \times 10, A4 = -0.97978 \times 10^{-1}, A6 = 0.23732 \times 10^{-1}, A8 = -0.25696 \times 10^{-2}, A10 = -0.40956 \times 10^{-5}$

TABLE 16

Example 16
$f = 5.413, FNO = 2.8$

| Radius of Curvature | Axial Distance | Refractive Index | Abbe Number |
|---|---|---|---|
| r1* = 3.262 | d1 = 1.267 | N1 = 1.53048 | ν1 = 55.72 (L1) |
| r2* = 20.506 | d2 = 0.605 | | |
| r3 = ∞ (ST) | d3 = 1.011 | | |
| r4* = −2.627 | d4 = 1.329 | N2 = 1.53048 | ν2 = 55.72 (L2) |
| r5* = −1.750 | d5 = 0.100 | | |
| r6* = 6.747 | d6 = 1.769 | N3 = 1.58340 | ν3 = 30.23 (L3) |
| r7* = 2.711 | d7 = 0.500 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.23583, A4 = 0.42634 \times 10^{-2}, A6 = 0.70946 \times 10^{-3}, A8 = 0.83522 \times 10^{-4}, A10 = 0.22563 \times 10^{-4}$
Aspherical Surface Data of Surface r2
$\epsilon = 0.13080 \times 10^2, A4 = 0.76363 \times 10^{-2}, A6 = -0.96051 \times 10^{-3}, A8 = 0.12099 \times 10^{-2}, A10 = -0.32280 \times 10^{-3}$
Aspherical Surface Data of Surface r4
$\epsilon = 0.14778 \times 10, A4 = 0.46580 \times 10^{-2}, A6 = -0.48590 \times 10^{-1}, A8 = 0.29449 \times 10^{-1}, A10 = -0.35940 \times 10^{-2}$
Aspherical Surface Data of Surface r5
$\epsilon = 0.54871, A4 = -0.31360 \times 10^{-1}, A6 = 0.95481 \times 10^{-2}, A8 = -0.21117 \times 10^{-2}, A10 = 0.74248 \times 10^{-3}$
Aspherical Surface Data of Surface r6
$\epsilon = 0.35876 \times 10^{-1}, A4 = -0.60741 \times 10^{-1}, A6 = 0.13571 \times 10^{-1}, A8 = -0.98325 \times 10^{-3}, A10 = -0.49719 \times 10^{-4}$
Aspherical Surface Data of Surface r7
$\epsilon = -0.54011 \times 10, A4 = -0.17861 \times 10^{-1}, A6 = 0.16540 \times 10^{-3}, A8 = 0.11796 \times 10^{-3}, A10 = -0.10468 \times 10^{-4}$

TABLE 17

Example 17
$f = 5.414, FNO = 2.8$

| Radius of Curvature | Axial Distance | Refractive Index | Abbe Number |
|---|---|---|---|
| r1* = 2.566 | d1 = 1.227 | N1 = 1.53048 | ν1 = 55.72 (L1) |

TABLE 17-continued

Example 17
f = 5.414, FNO = 2.8

| Radius of Curvature | Axial Distance | Refractive Index | Abbe Number |
|---|---|---|---|
| r2* = 18.606 | d2 = 0.369 | | |
| r3 = ∞ (ST) | d3 = 0.935 | | |
| r4* = −1.834 | d4 = 1.208 | N2 = 1.53048 | ν2 = 55.72 (L2) |
| r5* = −1.611 | d5 = 0.100 | | |
| r6* = 7.215 | d6 = 1.581 | N3 = 1.58340 | ν3 = 30.23 (L3) |
| r7* = 2.841 | d7 = 0.500 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.16794$, $A4 = 0.43888 \times 10^{-2}$, $A6 = 0.28598 \times 10^{-3}$, $A8 = 0.32325 \times 10^{-3}$, $A10 = -0.24401 \times 10^{-3}$
Aspherical Surface Data of Surface r2
$\epsilon = -0.73024 \times 10$, $A4 = -0.29787 \times 10^{-2}$, $A6 = -0.20862 \times 10^{-2}$, $A8 = -0.10682 \times 10^{-2}$, $A10 = 0.34571 \times 10^{-3}$
Aspherical Surface Data of Surface r4
$\epsilon = 0.12492 \times 10$, $A4 = 0.29931 \times 10^{-2}$, $A6 = -0.49256 \times 10^{-1}$, $A8 = 0.23979 \times 10^{-1}$, $A10 = 0.79079 \times 10^{-3}$
Aspherical Surface Data of Surface r5
$\epsilon = 0.53675$, $A4 = -0.23290 \times 10^{-1}$, $A6 = 0.52301 \times 10^{-2}$, $A8 = 0.10769 \times 10^{-2}$, $A10 = 0.44801 \times 10^{-3}$
Aspherical Surface Data of Surface r6
$\epsilon = 0.20000 \times 10$, $A4 = -0.66312 \times 10^{-1}$, $A6 = 0.15524 \times 10^{-1}$, $A8 = -0.15169 \times 10^{-2}$, $A10 = -0.38654 \times 10^{-4}$
Aspherical Surface Data of Surface r7
$\epsilon = -0.60000 \times 10$, $A4 = -0.25548 \times 10^{-1}$, $A6 = 0.14515 \times 10^{-2}$, $A8 = -0.25702 \times 10^{-4}$, $A10 = -0.80128 \times 10^{-5}$

TABLE 18

Example 18
f = 3.470, FNO = 2.8

| Radius of Curvature | Axial Distance | Refractive Index | Abbe Number |
|---|---|---|---|
| r1* = 1.928 | d1 = 1.028 | N1 = 1.53048 | ν1 = 55.72 (L1) |
| r2* = 2.310 | d2 = 0.478 | | |
| r3 = ∞ (ST) | d3 = 0.300 | | |
| r4* = 8.421 | d4 = 1.304 | N2 = 1.53048 | ν2 = 55.72 (L2) |
| r5* = −1.151 | d5 = 0.655 | | |
| r6* = −0.468 | d6 = 0.720 | N3 = 1.58340 | ν3 = 30.23 (L3) |
| r7* = −0.694 | d7 = 0.300 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.10000 \times 10$, $A4 = -0.45870 \times 10^{-2}$, $A6 = 0.29663 \times 10^{-2}$, $A8 = -0.12412 \times 10^{-2}$, $A10 = -0.94981 \times 10^{-3}$
Aspherical Surface Data of Surface r2
$\epsilon = 0.10000 \times 10$, $A4 = -0.11631 \times 10^{-1}$, $A6 = 0.15359$, $A8 = -0.35362$, $A10 = 0.22705$
Aspherical Surface Data of Surface r4
$\epsilon = 0.10000 \times 10$, $A4 = -0.12407$, $A6 = 0.87272 \times 10^{-1}$, $A8 = -0.30646$, $A10 = 0.23712$
Aspherical Surface Data of Surface r5
$\epsilon = 0.10000 \times 10$, $A4 = 0.27864 \times 10^{-1}$, $A6 = 0.64946 \times 10^{-1}$, $A8 = -0.13857$, $A10 = 0.11579$
Aspherical Surface Data of Surface r6
$\epsilon = 0.13801$, $A4 = 0.36196$, $A6 = 0.16987$, $A8 = -0.10315$, $A10 = 0.81031 \times 10^{-1}$
Aspherical Surface Data of Surface r7
$\epsilon = 0.17413$, $A4 = 0.15173$, $A6 = 0.72208 \times 10^{-1}$, $A8 = -0.28908 \times 10^{-1}$, $A10 = 0.74165 \times 10^{-2}$

TABLE 19

Example 19
f = 3.469, FNO = 2.8

| Radius of Curvature | Axial Distance | Refractive Index | Abbe Number |
|---|---|---|---|
| r1* = 2.173 | d1 = 1.103 | N1 = 1.53048 | ν1 = 55.72 (L1) |
| r2* = 2.584 | d2 = 0.602 | | |
| r3 = ∞ (ST) | d3 = 0.328 | | |
| r4* = 6.726 | d4 = 1.283 | N2 = 1.53048 | ν2 = 55.72 (L2) |
| r5* = −1.160 | d5 = 0.736 | | |
| r6* = −0.459 | d6 = 0.738 | N3 = 1.58340 | ν3 = 30.23 (L3) |
| r7* = −0.680 | d7 = 0.300 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.10000 \times 10$, $A4 = 0.87958 \times 10^{-3}$, $A6 = 0.42137 \times 10^{-2}$, $A8 = -0.16799 \times 10^{-3}$, $A10 = -0.19193 \times 10^{-3}$
Aspherical Surface Data of Surface r2
$\epsilon = 0.10000 \times 10$, $A4 = 0.93253 \times 10^{-2}$, $A6 = 0.15533$, $A8 = -0.24491$, $A10 = 0.13194$
Aspherical Surface Data of Surface r4
$\epsilon = 0.10000 \times 10$, $A4 = -0.98391 \times 10^{-1}$, $A6 = 0.94609 \times 10^{-1}$, $A8 = -0.17520$, $A10 = 0.12094$
Aspherical Surface Data of Surface r5
$\epsilon = 0.10000 \times 10$, $A4 = 0.44653 \times 10^{-1}$, $A6 = 0.55013 \times 10^{-1}$, $A8 = -0.12054$, $A10 = 0.11213$
Aspherical Surface Data of Surface r6
$\epsilon = 0.13153$, $A4 = 0.36562$, $A6 = 0.16321$, $A8 = -0.11039$, $A10 = 0.86597 \times 10^{-1}$
Aspherical Surface Data of Surface r7
$\epsilon = 0.16282$, $A4 = 0.15658$, $A6 = 0.66062 \times 10^{-1}$, $A8 = -0.28592 \times 10^{-1}$, $A10 = 0.75366 \times 10^{-2}$

TABLE 20

Example 20
f = 2.357, FNO = 2.8

| Radius of Curvature | Axial Distance | Refractive Index | Abbe Number |
|---|---|---|---|
| r1* = 3.284 | d1 = 0.988 | N1 = 1.53048 | ν1 = 55.72 (L1) |
| r2* = 8.603 | d2 = 0.249 | | |
| r3 = ∞ (ST) | d3 = 0.231 | | |
| r4* = 2.351 | d4 = 1.000 | N2 = 1.53048 | ν2 = 55.72 (L2) |
| r5* = −0.806 | d5 = 0.367 | | |
| r6* = −0.328 | d6 = 0.700 | N3 = 1.58340 | ν3 = 30.23 (L3) |
| r7* = −0.557 | d7 = 0.200 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.10000 \times 10$, $A4 = -0.82390 \times 10^{-1}$, $A6 = -0.51231 \times 10^{-3}$, $A8 = -0.31114 \times 10^{-1}$, $A10 = 0.20505 \times 10^{-1}$
Aspherical Surface Data of Surface r2
$\epsilon = 0.10000 \times 10$, $A4 = -0.22908$, $A6 = 0.19307$, $A8 = -0.66911$, $A10 = 0.11352 \times 10$
Aspherical Surface Data of Surface r4
$\epsilon = 0.10000 \times 10$, $A4 = -0.31044$, $A6 = -0.13877$, $A8 = 0.59855$, $A10 = -0.34008 \times 10$
Aspherical Surface Data of Surface r5
$\epsilon = 0.10000 \times 10$, $A4 = 0.19846$, $A6 = 0.34588$, $A8 = -0.10718 \times 10$, $A10 = 0.22259 \times 10$
Aspherical Surface Data of Surface r6
$\epsilon = 0.14294$, $A4 = 0.16786 \times 10$, $A6 = 0.77941$, $A8 = -0.21235 \times 10$, $A10 = 0.29745 \times 10$
Aspherical Surface Data of Surface r7
$\epsilon = 0.22025$, $A4 = 0.51811$, $A6 = 0.40947$, $A8 = -0.41631$, $A10 = 0.19224$

TABLE 21

Example 21
f = 3.909, FNO = 2.8

| Radius of Curvature | Axial Distance | Refractive Index | Abbe Number |
|---|---|---|---|
| r1* = 1.946 | d1 = 1.063 | N1 = 1.53048 | ν1 = 55.72 (L1) |
| r2* = 2.908 | d2 = 0.461 | | |
| r3 = ∞ (ST) | d3 = 0.369 | | |
| r4* = 25.898 | d4 = 1.214 | N2 = 1.53048 | ν2 = 55.72 (L2) |
| r5* = −1.222 | d5 = 0.719 | | |
| r6* = −0.512 | d6 = 0.864 | N3 = 1.58340 | ν3 = 30.23 (L3) |
| r7* = −0.791 | d7 = 0.300 | | |
| r8 = ∞ | d8 = 0.500 | N4 = 1.51680 | ν4 = 64.20 (GF) |
| r9 = ∞ | | | |

Aspherical Surface Data of Surface r1
$\epsilon = 0.10000 \times 10$, $A4 = -0.71083 \times 10^{-2}$, $A6 = 0.83355 \times 10^{-2}$, $A8 = -0.43965 \times 10^{-2}$, $A10 = 0.15236 \times 10^{-2}$
Aspherical Surface Data of Surface r2
$\epsilon = 0.10000 \times 10$, $A4 = 0.48178 \times 10^{-2}$, $A6 = 0.77795 \times 10^{-1}$, $A8 = -0.11808$, $A10 = 0.82135 \times 10^{-1}$
Aspherical Surface Data of Surface r4
$\epsilon = 0.10000 \times 10$, $A4 = -0.67192 \times 10^{-1}$, $A6 = 0.75859 \times 10^{-2}$, $A8 = -0.45131 \times 10^{-1}$, $A10 = -0.15867 \times 10^{-2}$
Aspherical Surface Data of Surface r5
$\epsilon = 0.10000 \times 10$, $A4 = 0.57645 \times 10^{-1}$, $A6 = 0.64121 \times 10^{-2}$, $A8 = -0.12843 \times 10^{-1}$, $A10 = 0.27561 \times 10^{-1}$
Aspherical Surface Data of Surface r6
$\epsilon = 0.15149$, $A4 = 0.34428$, $A6 = 0.14586$, $A8 = -0.13119$, $A10 = 0.71148 \times 10^{-1}$
Aspherical Surface Data of Surface r7
$\epsilon = 0.19214$, $A4 = 0.13217$, $A6 = 0.45573 \times 10^{-1}$, $A8 = -0.23420 \times 10^{-1}$, $A10 = 0.52064 \times 10^{-2}$

TABLE 22

Example 22
f = 3.792, FNO = 2.9

| Radius of Curvature | Axial Distance | Refractive Index | Abbe Number |
|---|---|---|---|
| r1 = ∞ (ST) | d1 = 0.150 | | |
| r2* = 1.175 | d2 = 0.958 | N1 = 1.48749 | ν1 = 70.44 (L1) |
| r3* = 2.520 | d3 = 0.726 | | |
| r4* = 12.045 | d4 = 1.253 | N2 = 1.53048 | ν2 = 55.72 (L2) |
| r5* = 4.669 | d5 = 0.300 | | |
| r6 = ∞ | d6 = 0.500 | N3 = 1.51680 | ν3 = 64.20 (GF) |
| r7 = ∞ | | | |

Aspherical Surface Data of Surface r2
$\epsilon = -0.40818 \times 10$, $A4 = 0.33779$, $A6 = -0.18548$, $A8 = 0.12890$, $A10 = -0.94438 \times 10^{-2}$
Aspherical Surface Data of Surface r3
$\epsilon = 0.10000 \times 10$, $A4 = 0.12179 \times 10^{-1}$, $A6 = 0.35030$, $A8 = -0.60572$, $A10 = 0.79691$
Aspherical Surface Data of Surface r4
$\epsilon = 0.10000 \times 10$, $A4 = -0.12855$, $A6 = -0.15977$, $A8 = 0.28053$, $A10 = -0.23948$
Aspherical Surface Data of Surface r5
$\epsilon = 0.10000 \times 10$, $A4 = -0.72820 \times 10^{-1}$, $A6 = 0.78301 \times 10^{-2}$, $A8 = -0.69268 \times 10^{-3}$, $A10 = -0.83004 \times 10^{-3}$

TABLE 23

Example 23
f = 3.795, FNO = 2.9

| Radius of Curvature | Axial Distance | Refractive Index | Abbe Number |
|---|---|---|---|
| r1 = ∞ (ST) | d1 = 0.150 | | |
| r2* = 1.235 | d2 = 0.833 | N1 = 1.53048 | ν1 = 55.72 (L1) |
| r3* = 2.240 | d3 = 1.007 | | |
| r4* = 5.002 | d4 = 1.120 | N2 = 1.53048 | ν2 = 55.72 (L2) |
| r5* = 3959 | d5 = 0.300 | | |

TABLE 23-continued

Example 23
f = 3.795, FNO = 2.9

| Radius of Curvature | Axial Distance | Refractive Index | Abbe Number |
|---|---|---|---|
| r6 = ∞ | d6 = 0.500 | N3 = 1.51680 | ν3 = 64.20 (GF) |
| r7 = ∞ | | | |

Aspherical Surface Data of Surface r2
$\epsilon = -0.46326 \times 10$, $A4 = 0.33512$, $A6 = -0.19378$, $A8 = 0.14280$, $A10 = -0.18959 \times 10^{-1}$
Aspherical Surface Data of Surface r3
$\epsilon = 0.10000 \times 10$, $A4 = 0.44728 \times 10^{-1}$, $A6 = 0.30295$, $A8 = -0.48503$, $A10 = 0.63805$
Aspherical Surface Data of Surface r4
$\epsilon = 0.10000 \times 10$, $A4 = -0.92377 \times 10^{-1}$, $A6 = -0.77511 \times 10^{-1}$, $A8 = 0.97891 \times 10^{-1}$, $A10 = -057011 \times 10^{-1}$
Aspherical Surface Data of Surface r5
$\epsilon = 0.10000 \times 10$, $A4 = -0.61335 \times 10^{-1}$, $A6 = -0.48871 \times 10^{-2}$, $A8 = 0.40637 \times 10^{-2}$, $A10 = -0.13823 \times 10^{-2}$

TABLE 24

Example 24
f = 3.709, FNO = 2.9

| Radius of Curvature | Axial Distance | Refractive Index | Abbe Number |
|---|---|---|---|
| r1 = ∞ (ST) | d1 = 0.150 | | |
| r2* = 1.255 | d2 = 0.814 | N1 = 1.53048 | ν1 = 55.72 (L1) |
| r3* = 2.193 | d3 = 1.013 | | |
| r4* = 3.601 | d4 = 1.078 | N2 = 1.53048 | ν2 = 55.72 (L2) |
| r5* = 3.769 | d5 = 0.300 | | |
| r6 = ∞ | d6 = 0.500 | N3 = 1.51680 | ν3 = 64.20 (GF) |
| r7 = ∞ | | | |

Aspherical Surface Data of Surface r2
$\epsilon = -0.46855 \times 10$, $A4 = 0.32658$, $A6 = -0.20012$, $A8 = 0.17345$, $A10 = -0.48587 \times 10^{-1}$
Aspherical Surface Data of Surface r3
$\epsilon = 0.10000 \times 10$, $A4 = 0.36697 \times 10^{-1}$, $A6 = 0.29674$, $A8 = -0.43590$, $A10 = 0.53792$
Aspherical Surface Data of Surface r4
$\epsilon = 0.10000 \times 10$, $A4 = -0.95066 \times 10^{-1}$, $A6 = -0.26867 \times 10^{-1}$, $A8 = 0.34964 \times 10^{-1}$, $A10 = -0.21189 \times 10^{-1}$
Aspherical Surface Data of Surface r5
$\epsilon = 0.10000 \times 10$, $A4 = -0.53454 \times 10^{-1}$, $A6 = -0.64541 \times 10^{-2}$, $A8 = 0.37370 \times 10^{-2}$, $A10 = -0.11340 \times 10^{-2}$

TABLE 25

Example 25
f = 2.537, FNO = 2.9

| Radius of Curvature | Axial Distance | Refractive Index | Abbe Number |
|---|---|---|---|
| r1 = ∞ (ST) | d1 = 0.100 | | |
| r2* = 0.957 | d2 = 0.700 | N1 = 1.53048 | ν1 = 55.72 (L1) |
| r3* = 1.385 | d3 = 0.513 | | |
| r4* = 1.715 | d4 = 0.755 | N2 = 1.53048 | ν2 = 55.72 (L2) |
| r5* = 3.245 | d5 = 0.200 | | |
| r6 = ∞ | d6 = 0.500 | N3 = 1.51680 | ν3 = 64.20 (GF) |
| r7 = ∞ | | | |

Aspherical Surface Data of Surface r2
$\epsilon = -0.70202 \times 10$, $A4 = 0.96112$, $A6 = -0.16643 \times 10$, $A8 = 0.26598 \times 10$, $A10 = -0.17468 \times 10$
Aspherical Surface Data of Surface r3
$\epsilon = 0.10000 \times 10$, $A4 = -0.11476$, $A6 = 0.19645 \times 10$, $A8 = -0.54091 \times 10$, $A10 = 0.85369 \times 10$
Aspherical Surface Data of Surface r4
$\epsilon = 0.10000 \times 10$, $A4 = -0.20459$, $A6 = -0.15755$, $A8 = 0.39537$, $A10 = -0.29209$
Aspherical Surface Data of Surface r5
$\epsilon = 0.10000 \times 10$, $A4 = 0.10628 \times 10^{-1}$, $A6 = -0.23532$, $A8 = 0.19577$, $A10 = -0.67370 \times 10^{-1}$

TABLE 26

| | Condition (1) D/F | Condition (2), (2a) (R1 + R2)/(R1 − R2) | Condition (3), (3a) (R3 + R4)/(R3 − R4) | Condition (4), (4a) f/f1 | Condition (5), (5a) f/f2 |
|---|---|---|---|---|---|
| Example 1 | 0.94 | 0.90 | −4.67 | 1.55 | −0.09 |
| Example 2 | 0.98 | 0.85 | −4.30 | 1.58 | −0.19 |
| Example 3 | 0.94 | 0.88 | −4.46 | 1.55 | −0.21 |
| Example 4 | 1.12 | 1.35 | −7.16 | 1.36 | −0.16 |
| Example 5 | 1.13 | 1.29 | −6.57 | 1.38 | 0.11 |
| Example 6 | 1.20 | 0.81 | −6.99 | 1.38 | 0.31 |
| Example 7 | 1.16 | 1.08 | −8.09 | 1.30 | 0.15 |
| Example 8 | 0.84 | 0.44 | −1.15 | 1.46 | −1.12 |
| Example 9 | 0.84 | 0.49 | −1.30 | 1.52 | −1.24 |

TABLE 27

| Lens Type | Power Arrangement | Example | Condition (A0) \|f/f1\| | Condition (A1), (B1) f/f3 | Condition (A2), (B2) (A2a), (A2b) f3/f1 | Condition (A3), (B3) (A3a) T6/f |
|---|---|---|---|---|---|---|
| A | −, +, − | 10 | 0.325 | −0.865 | — | 0.296 |
| | | 11 | 0.243 | −1.252 | — | 0.202 |
| | | 12 | 0.442 | −1.679 | — | 0.202 |
| | +, +, − | 13 | 0.321 | −1.810 | −0.244 | 0.179 |
| | | 14 | 0.218 | −1.463 | −0.219 | 0.200 |
| | | 15 | — | — | −0.895 | 0.173 |
| | | 16 | — | — | −1.299 | 0.327 |
| | | 17 | — | — | −1.695 | 0.292 |
| B | +, +, + | 18 | — | 0.245 | 1.247 | 0.207 |
| | | 19 | — | 0.335 | 0.775 | 0.213 |
| | | 20 | — | 0.214 | 1.172 | 0.297 |
| | | 21 | — | 0.224 | 2.173 | 0.221 |

TABLE 28

| | Condition (I) \|f2\|/f1 | Condition (II) T1/f | Condition (III) f/Y' | Condition (IV) V2 | Condition (V) TA/f |
|---|---|---|---|---|---|
| Example 22 | 4.2 | 0.25 | 1.72 | 55.72 | 0.19 |
| Example 23 | 14.1 | 0.22 | 1.73 | 55.72 | 0.27 |
| Example 24 | 11.1 | 0.22 | 1.69 | 55.72 | 0.27 |
| Example 25 | 1.6 | 0.28 | 1.69 | 55.72 | 0.20 |

What is claimed is:

1. A three-lens-element taking lens system for forming an image on a solid-state image sensor, comprising, from an object side:
   a first lens element formed of a uniform material and having a weak optical power;
   an aperture stop;
   a second lens element formed of a uniform material and having a positive optical power; and
   a third lens element formed of a uniform material, having a concave surface on an image side thereof and having a negative optical power,
   wherein the following conditions are fulfilled:

$|f/f1|<0.6$ $-2.2<f/f3<-0.79$ $0.05<T6/f<0.5$ where
   f represents a focal length of the taking lens system as a whole;
   f1 represents a focal length of the first lens element;
   f3 represents a focal length of the third lens element; and
   T6 represents the axial lens thickness of the third lens element.

2. The taking lens system of claim 1, wherein $0.179<T6/f<0.5$.

3. A three-lens-element taking lens system for forming an image on a solid-state image sensor, comprising, from an object side:
   a first lens element formed of a uniform material and having a positive optical power;
   an aperture stop;
   a second lens element formed of a uniform material and having a meniscus shape with a convex surface on an image side thereof and having a positive optical power; and
   a third lens element formed of a uniform material, having a meniscus shape with a concave surface on an image side thereof and having a negative optical power,
   wherein the following condition is fulfilled:

$0.05<T6/f<0.5$ where
   T6 represents an axial lens thickness of the third lens element; and
   f represents a focal length of the taking lens system as a whole.

4. A three-lens-element taking lens system for forming an image on a solid-state image sensor, comprising, from an object side:
   a first lens element having a weak optical power;
   an aperture stop;

a second lens element having a positive optical power; and a third lens element having a concave surface on an image side thereof and having a negative optical power, wherein each of said first, second and third lens elements has at least one aspherical surface, and wherein the following conditions are fulfilled:

$|f/f1|<0.6$ $-2.2<f/f3<-0.79$ $0.05<T6/f<0.5$ where f represents a focal length of the taking lens system as a whole;

f1 represents a focal length of the first lens element;

f3 represents a focal length of the third lens element; and

T6 represents the axial lens thickness of the third lens element.

5. The taking lens system of claim 4, wherein $0.179<T6/f<0.5$.

6. A three-lens-element taking lens system for forming an image on a solid-state image sensor, comprising a maximum of three optically powered lens elements consisting of, from an object side:

a first lens of element having a positive optical power;

a second lens element having a positive optical power; and a third lens element having a negative optical power, wherein each of said first, second and third lens elements has at least one aspherical surface, and wherein the following condition is fulfilled:

$-2.6<f3/f1<-0.15$ where f1 represents a focal length of the first lens element; and f3 represents a focal length of the third lens element;

and further including an aperture stop disposed between said first and second lens elements.

7. The taking lens system of claim 6, wherein $-1.695<f3/f1<-0.15$.

8. A three-lens-element taking lens system for forming an image on a solid-state image sensor, comprising, from an object side:

a first lens element having a positive optical power;

an aperture stop;

a second lens element having a meniscus shape with a convex surface on an image side thereof and having a positive optical power; and a third lens element having a meniscus shape with a concave surface on an image side thereof and having a negative optical power, wherein each of said first, second and third lens elements has at least one aspherical surface, and wherein the following condition is fulfilled:

$0.05<T6/f<0.5$ where

T6 represents an axial lens thickness of the third lens element; and f represents a focal length of the taking lens system as a whole.

9. A three-lens-element taking lens system for forming an image on a solid-state image sensor, comprising, from an object side:

a first lens element having a positive optical power;

an aperture stop;

a second lens element having a meniscus shape with a convex surface on an image side thereof and having a positive optical power; and a third lens element having a meniscus shape with a concave surface on an image side thereof and having a negative optical power, wherein the following conditions are fulfilled:

$0.05<T6/f<0.5$ $-1.695<f3/f1<-0.15$ where

T6 represents an axial lens thickness of the third lens element;

f represents a focal length of the taking lens system as a whole;

f1 represents a focal length of the first lens element; and f3 represents a focal length of the third lens element.

* * * * *